Feb. 18, 1941. R. M. THOMPSON Re. 21,723

CONTINUOUS PRESSURE SEPARATING DEVICE

Original Filed Jan. 10, 1933 13 Sheets-Sheet 1

INVENTOR
Robert M. Thompson
BY
G. Wright Arnold
ATTORNEY

Feb. 18, 1941. R. M. THOMPSON Re. 21,723

CONTINUOUS PRESSURE SEPARATING DEVICE

Original Filed Jan. 10, 1933 13 Sheets-Sheet 2

INVENTOR
Robert M. Thompson
BY
G. Wright Arnold
ATTORNEY

Feb. 18, 1941. R. M. THOMPSON Re. 21,723

CONTINUOUS PRESSURE SEPARATING DEVICE

Original Filed Jan. 10, 1933 13 Sheets-Sheet 3

INVENTOR
Robert M. Thompson
BY
Gilbright Driscoll
ATTORNEY

Feb. 18, 1941. R. M. THOMPSON Re. 21,723

CONTINUOUS PRESSURE SEPARATING DEVICE

Original Filed Jan. 10, 1933 13 Sheets-Sheet 4

INVENTOR
Robert M. Thompson
BY
Albright Arnold
ATTORNEY

Feb. 18, 1941. R. M. THOMPSON Re. 21,723

CONTINUOUS PRESSURE SEPARATING DEVICE

Original Filed Jan. 10, 1933 13 Sheets-Sheet 5

INVENTOR
Robert M. Thompson
BY
G. Wright Arnold
ATTORNEY

CONTINUOUS PRESSURE SEPARATING DEVICE

Original Filed Jan. 10, 1933 13 Sheets-Sheet 6

INVENTOR
Robert M. Thompson
BY
G. Bright Arnold
ATTORNEY

Feb. 18, 1941. R. M. THOMPSON Re. 21,723

CONTINUOUS PRESSURE SEPARATING DEVICE

Original Filed Jan. 10, 1933 13 Sheets-Sheet 7

INVENTOR.
Robert M. Thompson
BY G. Wright Arnold
ATTORNEY

CONTINUOUS PRESSURE SEPARATING DEVICE

Original Filed Jan. 10, 1933 13 Sheets-Sheet 8

INVENTOR
Robert M. Thompson
BY
G. Wright Arnold
ATTORNEY

CONTINUOUS PRESSURE SEPARATING DEVICE

Original Filed Jan. 10, 1933 13 Sheets-Sheet 9

INVENTOR
Robert M. Thompson
BY
Albright Arnold
ATTORNEY

Feb. 18, 1941. R. M. THOMPSON Re. 21,723

CONTINUOUS PRESSURE SEPARATING DEVICE

Original Filed Jan. 10, 1933 13 Sheets-Sheet 10

INVENTOR.
Robert M. Thompson
BY
Albright Arnold
ATTORNEY

CONTINUOUS PRESSURE SEPARATING DEVICE
Original Filed Jan. 10, 1933 13 Sheets-Sheet 11
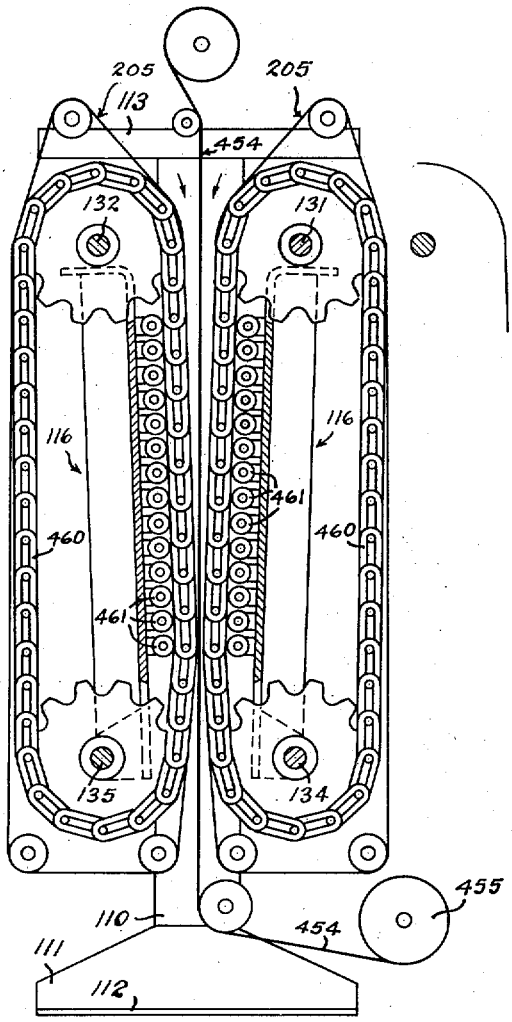
Fig. 35
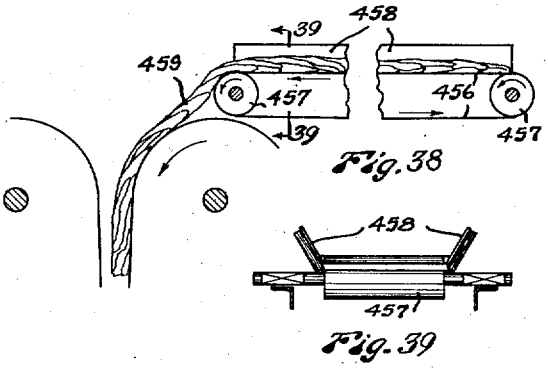
Fig. 38
Fig. 39
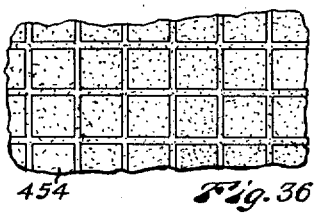
Fig. 36
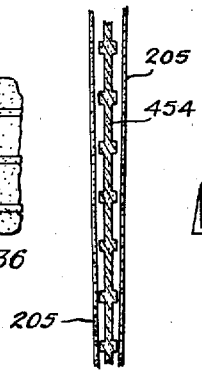
Fig. 37
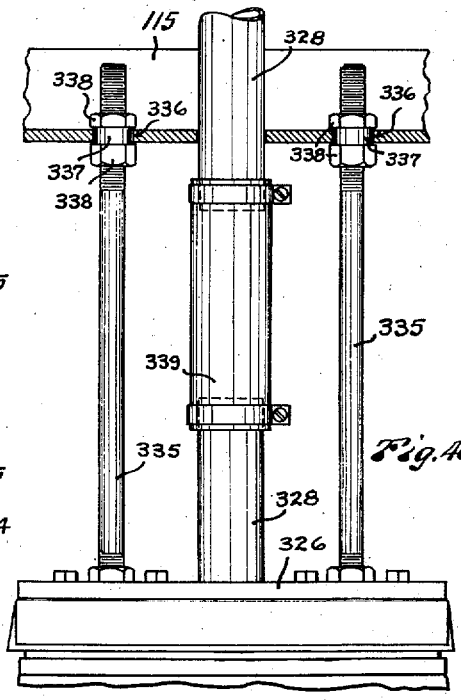
Fig. 40
INVENTOR
Robert M. Thompson
BY
Gilbright Arnold
ATTORNEY Feb. 18, 1941. R. M. THOMPSON Re. 21,723

CONTINUOUS PRESSURE SEPARATING DEVICE

Original Filed Jan. 10, 1933 13 Sheets-Sheet 12

INVENTOR
Robert M. Thompson
BY
G. Wright Arnold
ATTORNEY

CONTINUOUS PRESSURE SEPARATING DEVICE

Original Filed Jan. 10, 1933 13 Sheets-Sheet 13

INVENTOR
Robert M. Thompson
BY Albright Arnold
ATTORNEY

Reissued Feb. 18, 1941

Re. 21,723

UNITED STATES PATENT OFFICE 21,723

CONTINUOUS PRESSURE SEPARATING DEVICE

Robert M. Thompson, Seattle, Wash., assignor to Thompson Continuously Operating Filter Press Company, a corporation of Washington Original No. 2,112,869, dated April 5, 1938, Serial No. 650,990, January 10, 1933. Application for reissue September 23, 1938, Serial No. 231,388

36 Claims. (Cl. 210—197)

My invention relates to the art of devices designed to separate fluids or liquids from other fluids or liquids of greater fluidity and fluids or liquids from solids.

More particularly, my invention relates to a combined press and filter press or to a press designed for continuous operation which is characterized by the development of extremely high pressures and practical and efficient operation. Particularly does my invention relate to simplifying and reducing the cost of the filtration or filtration step in the industrial arts, which step at present constitutes one of the expensive operations in manufacturing. The invention in general relates to the art of filtering or filtration disclosed in Patent No. 1,778,342, issued to me October 14, 1930 and in my application, Ser. No. 509,595, Patent No. 1,997,611, issued to me April 16, 1935.

It is common practice in the art of filtration to refer to devices designed for the separation of materials by the application of force or pressure to the materials from without, as "presses"; while devices designed for the separation of materials by having the force or pressure transmitted through the materials themselves as "filter presses." "Filter presses" are usually used where the amount of solids to be separated is but a small proportion of the total mobile mass composed of said solids and liquids in which said solids are disposed and hence the said materials are pumped into the fitler press. "Presses" on the other hand, are used where the proportion of solid matter is much greater in relation to that of the liquid composing said materials to be filtered. The distinction between the two devices will develop clearly in the following paragraphs.

By rendering the filtering continuous, my device herein disclosed provides for utilizing the filter press principle with materials in which the solids are the predominant percentage of the material being treated. This is just the reverse of the common practice. Heretofore, the devices in common use for materials having only a small percentage of liquids, has been the press type rather than the filter press type. By providing for relatively excessively high pressures and fluid tight chambers and continuous discharge of cake in a filter press type of device, the machine embodying my invention herein set forth, has solved one of the difficult steps in manufacturing processes.

In the industrial arts filtration is very often a costly item in the manufacturing process. This is due in part to the intermittent character of the operation of the filter devices and to the large amount of manual attention which is incident thereto. Moreover, in the filtering process there are points at which the expressed liquids are more clear than at other points. The clearer liquids are usually obtained during the later stages of the separating process due to the fact that these liquids pass through the filtering medium after a deposit of the retained solids on the filtering medium has accumulated, which retained solids usually form an important part of the filtering medium. The early liquids expressed before the deposit of said solids in the form of a filter on the filter cloth or medium may be cloudy. By separately drawing off the cloudy portion of the expressed liquid during the early stages of the filtration process, a minimum quantity of the cloudy filtrate is retained with the clear filtrate.

Objection obtains to the devices as heretofore designed in the leakage that takes place by the joints formed between the stationary parts and moving parts of the device. Also serious objection obtains to the friction developed between said parts. This friction results in excessive wearing away of the filter cloth as well as other parts. Furthermore, serious objection obtains in that the great pressures developed are difficult of control and when developed locally or are unevenly distributed result in breaking the machine.

In connection with the filtration part of the manufacturing process, it is frequently desirable to have a device which may be employed both as a press and as a filter press. The filter devices as heretofore in common use are not capable of this dual use. This involves the installation of both devices which involves great expense as well as the loss of important floor space.

The general objects of my present invention are to overcome the objections to prior devices of the nature hereinabove pointed out and to generally improve and increase the efficiency of continuous presses and filter presses, as well as to provide new means and modes of operation with new results.

Another important object of my invention is to provide an upright or substantially vertical press or filter press of this nature embodying two pendent press members, pivotally supported from their upper ends, between which press members the material passes while being filtered, said press members being connected with each other by transverse floatingly mounted tie means, whereby the heavy pressures produced between the two press members are counterbalanced at frequent intervals or section by section without being transmitted to other or mounting parts of the frame. This tie means may include springs capable of yielding to pressure exerted between the two pendent press members.

Another object is to provide equalizer means in connection with both the top and bottom of the pendent press members for compelling equal movement of said press members toward and away from the central medial vertical plane of the machine at all times, the upper equalizing means preferably being in the form of manually operated adjusting mechanism and the lower equalizing means preferably being automatically operated in response to pressure.

Another primary object is to provide a press and filter press of this nature having a filter chamber formed by four belts, all moving in the same direction and at substantially the same rate of speed, whereby wear and needless consumption of power due to friction is reduced to a minimum, and the problem of preventing leakage of liquids even under relatively excessively high as well as ordinary pressures is very much simplified, two of said belts preferably being of material impervious to the passage of liquid and being supported by resilient means.

A further object is to provide for the application of intermittent or periodic increase of pressure to the material being treated, whereby short drainage periods are afforded during the intervals when the pressure is relatively sustained but not increased, as well as during such periods of increasing the pressure. The preferred means for effecting such periodic action may be in the form of a ratchet drive for transmitting the power to the filter means, said ratchet drive affording an intermittent drive of relatively slow and readily variable speed.

Other and more specific objects are to provide efficient self-adjusting plug means for maintaining a substantially liquid tight contact with the moving belts; to provide suction means for picking up any liquid which escapes around the plug means; to provide new and efficient means for picking up or collecting the liquid filtrate after it has passed through the filter cloths and slats (to prevent reabsorption of the liquid by the solid matter (cake) during its emergence from the pressure zone); to provide types of slat members for slat belts new as to form and construction, whereby the withdrawal of filtrate away from the pressing face of the slats is facilitated; to provide for employing traveling porous absorbent means as an assistance to carrying through the pressure chamber the material being treated and promoting the drainage of the fluid part of the material; and to provide automatic means for governing the speed and the rate of feed to the machine in proportion to the thickness of the cake or layer of solid matter in the machine at the point of maximum pressure.

The above mentioned general objects of my invention, together with others inherent in the same, are attained by the mechanism illustrated in the following drawings, the same being preferred exemplary forms of embodiment of my invention, throughout which drawings like reference numerals indicate like parts:

Figure 35 shows a modified form of my invention in which the filter belts are supported on chain mesh belts, which, in turn, are supported on rollers, the chain mesh belts taking the place of the slat belts shown in the preceding figures. This figure also shows a movable carrier member in the nature of a very porous fabric disposed between the filter belts, said carrier member providing drainage for materials which tend to pack and said carrier also assisting in feeding the materials through the machine.

Figures 36 and 37 are enlarged fragmentary views in elevation and cross section, respectively, of the porous fabric shown in Fig. 35.

Figure 38 is a diagrammatic view partly in side elevation and partly in section showing one method of feeding material off of a conveyor into my press and filter press.

Figure 39 is a cross section substantially on line 39—39 of Fig. 38.

Figure 40 is an enlarged detail showing the flexible means for supporting the packing plug between the four moving filter belts in such a manner as to insure an equal pressure of the plug against all filter belts.

Figure 41:
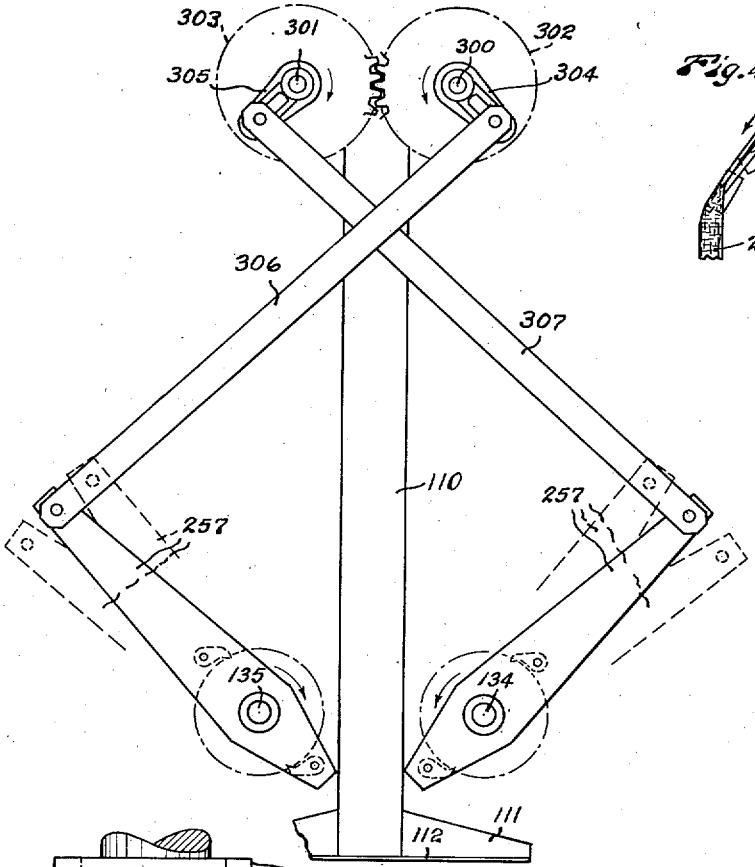

Figure 41 is a somewhat diagrammatic side elevation of another modified form of ratchet drive for my combined press and filter press in which the ratchet levers are connected directly to the crank arms.

Figure 42:
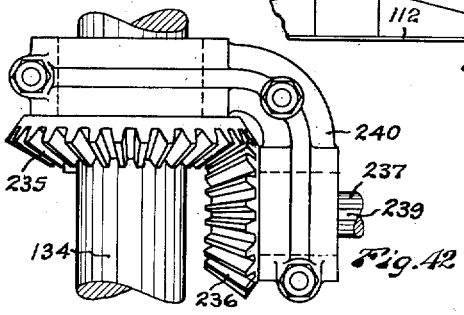

Figure 42 is a fragmentary plan view of parts of a bevel gear drive which may be used for the side chains of my combined press and filter press.

Figure 43:
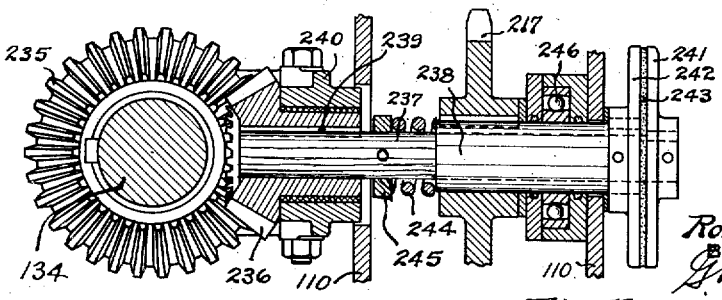

Figure 43 is a view partly in section and partly in elevation showing the complete drive of the bevel gear mechanism shown partly in Fig. 42.

Figure 44:
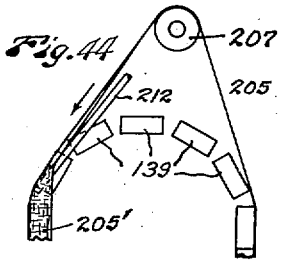

Figure 44 is a somewhat diagrammatic side elevation illustrating one means of guiding filter belts into my combined press and filter press.

Figure 45:
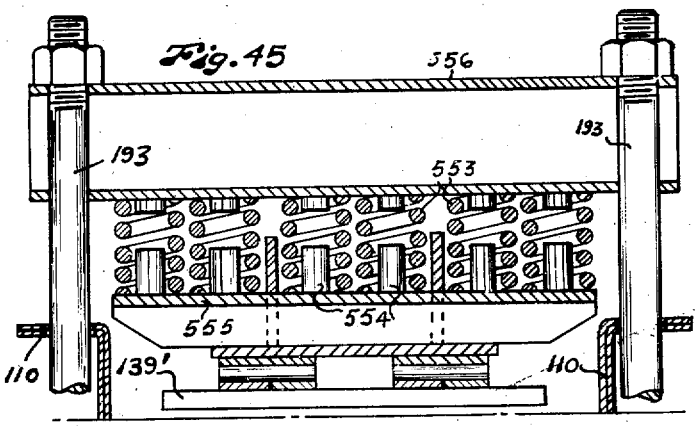
Figure 18:
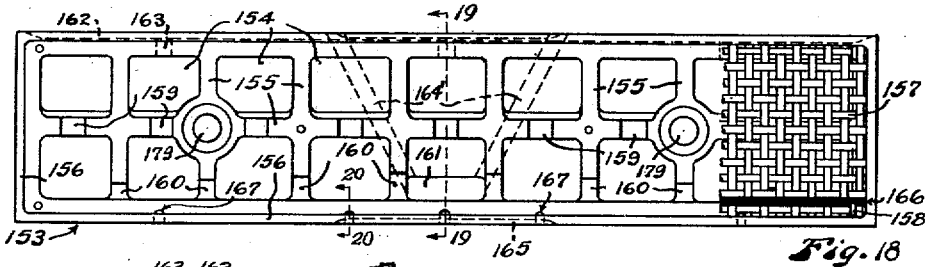
Figure 18 is a front elevation, with parts broken away, of one form of slat for the main slat belts, a wire mesh being used on the face of said slat.

Figure 45 is a fragmentary sectional view showing an alternative spring supporting structure for the main pendent frames.

Figure 4:
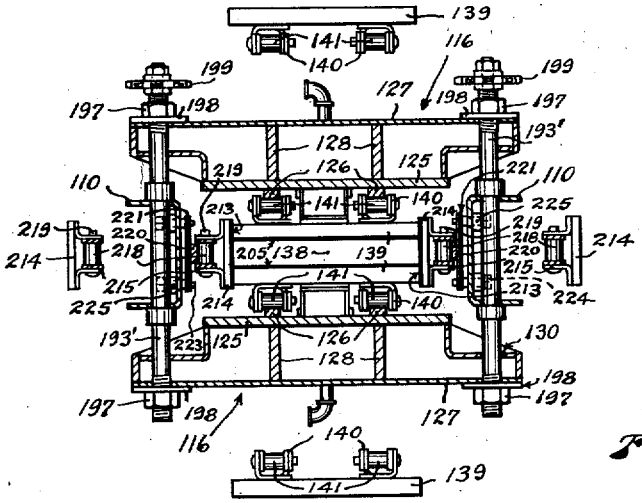
Figure 4 is a cross section substantially on broken line 4—4 of Fig. 3.
Figure 17:
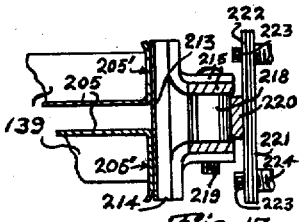
Figure 17 is a fragmentary sectional view through the side belt rail and side belts, showing a fragment of the main filter belts in the position in which they make sealing contact with the side belts.
Figure 46:
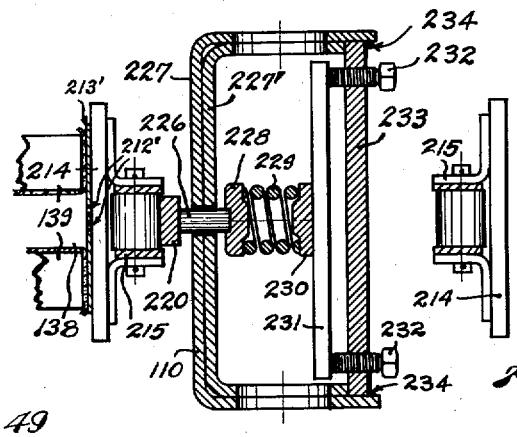

Figure 46 is a cross section through a side frame of my machine showing a coil spring resiliently supporting the side belt rail, said coil spring affording greater travel and being less subject to breakage than the flat springs shown in Figs. 4 and 17.

Figure 47:
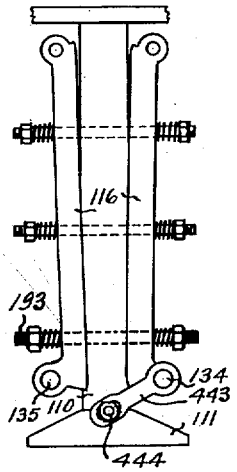

Figure 47 is a somewhat diagrammatic side elevation showing a modified form of my invention in which one of the pendent frame members is fixedly and adjustably secured at its lower end to a non-movable part of the frame.

Figure 48:
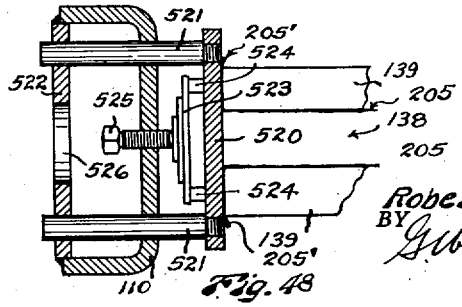

Figure 48 is a fragmentary sectional view of a modified form of the invention in which the impervious moving side belts are dispensed with and a highly polished non-movable plate is substituted in place thereof.

Figure 49:
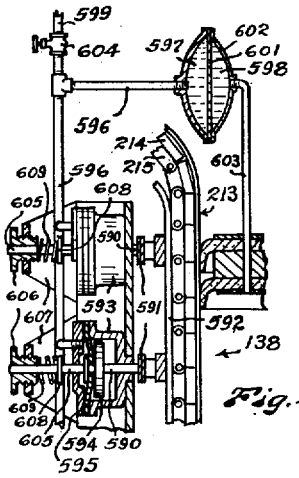

Figure 49 is a somewhat diagrammatic view partly in section and partly in elevation, showing means for supporting the impervious side belt means with a pressure which varies in proportion to the pressure in the filter chamber.

Figure 1:
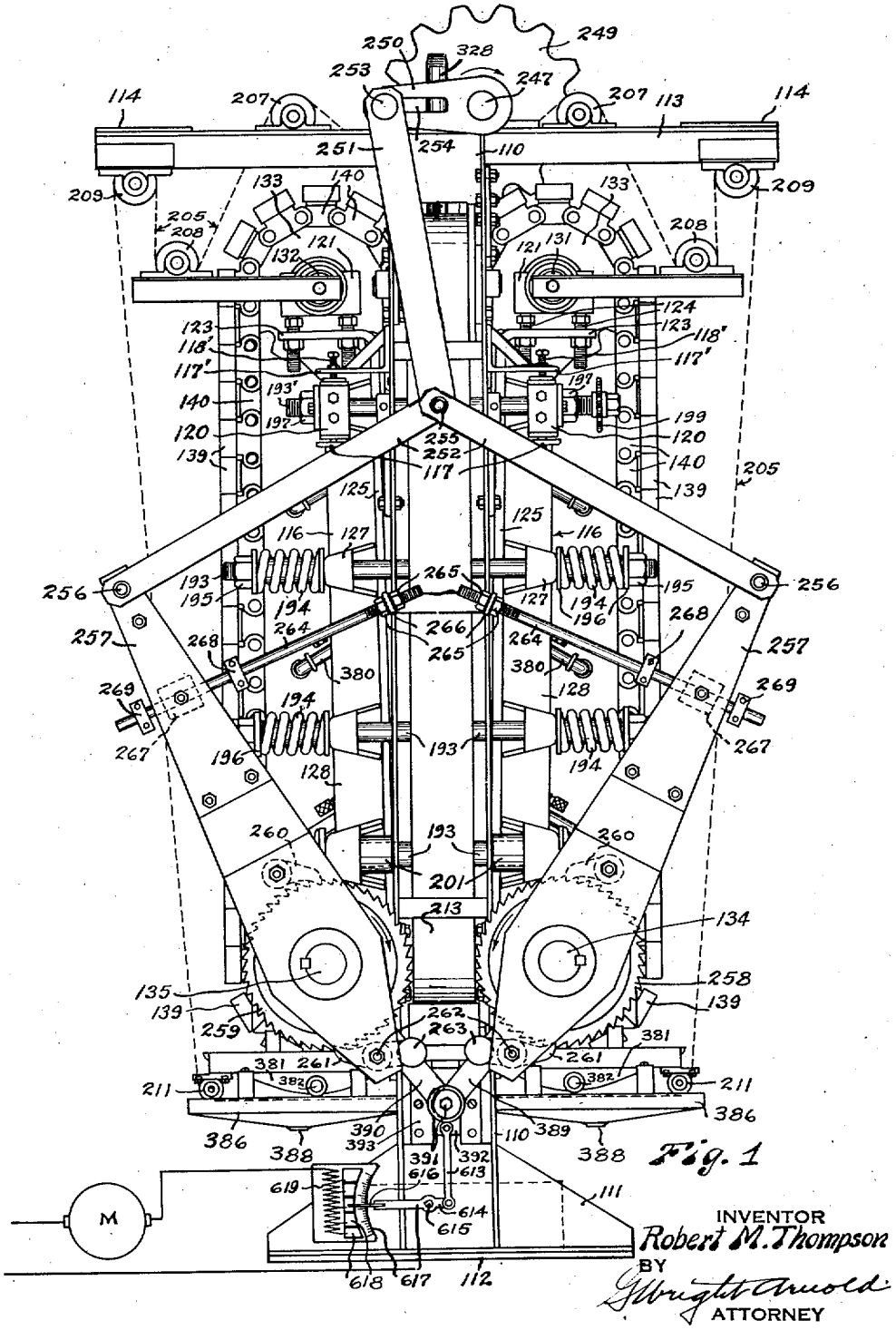
Figure 1 is a front elevation of a press and filter press constructed in accordance with my invention.
Figure 2:
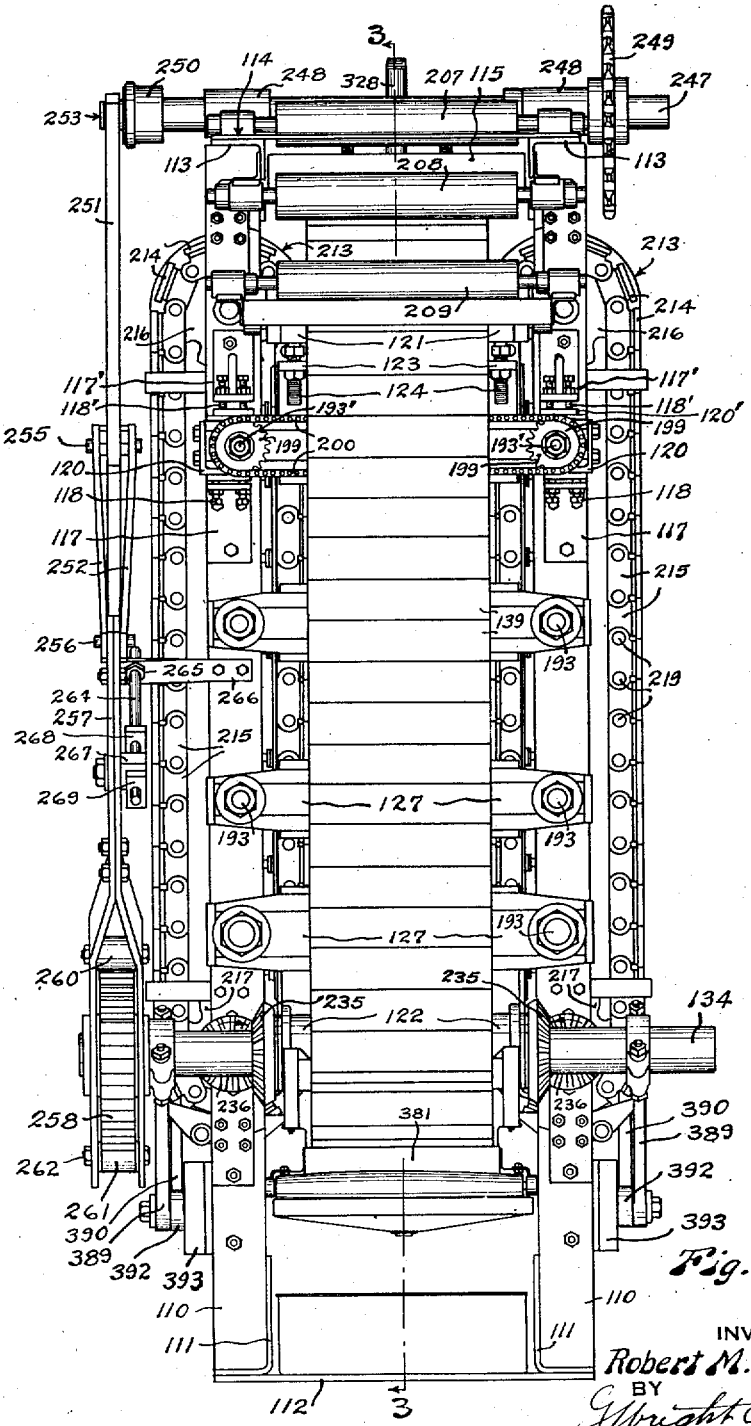
Figure 2 is a side elevation of the same.

Referring particularly to Figs. 1 to 17, inclusive, wherein I have illustrated one embodiment of my invention, I show a main frame formed of two upright parallel, spaced apart, channel shaped side members 110 provided with base members 111 and rigidly connected at their bottom ends by a cross plate 112, see Fig. 2. At their upper ends the side members 110 each have an angle bar 113 secured thereto. These angle bars extend at right angles to the member 110 and are rigidly secured together by transverse plates 114 positioned near the outer ends of the angle bars 113. A transverse angle bar 115 (Fig. 3) also extends cross wise between the top ends of the side frame members 110 and cooperates with the transverse plates 114 in rigidly connecting the two upper ends of the spaced apart side members 110 together. The angle bar 115 also provides support for a packing plug hereinafter described. The previously described parts form a rigid stationary and substantial frame on which the apparatus hereinafter described may be mounted.

Figure 7:
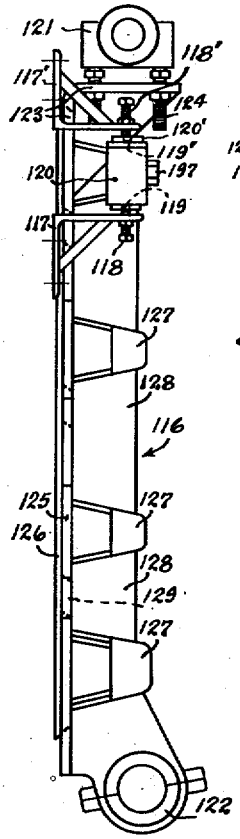
Figure 7 is an edge view of the same.

Two pendent frame members, designated generally by the numeral 116 are suspended from the stationary frame by means of angle brackets 117, which are secured to the upright frame members 110 and have set screws 118 therein which protrude into suitable depressions shown by dotted lines at 119 in Fig. 7, in bracket members 120 on the pendent frame members 116. Other bracket members 117', having set screws 118', are provided above the brackets 120 to prevent displacement of the pendent frame members due to up thrust. The ends of the set screws 118' are positioned in depressions 119' in plates 120' which rest slidably on brackets 120 and permit the small amount of swinging movement required by the pendent frames. The pivotal supports which are thus formed for the pendent frame members 116 are located near the upper ends of said frame members and in substantially vertical alignment between upper bearings 121 and lower bearings 122, see Figs. 6 and 7, which are provided on these frame members. The upper bearings 121 are adjustably supported from shelf like portions 123 at the upper ends of the pendent frames 116 by adjustable screw and nut means 124. This makes it possible to adjust the tension of slat belts, hereinafter described, which are supported by these bearings. The pendent frames, hereinafter also called strongbacks, 116 are essentially of strong and rigid construction, designed to withstand heavy pressure. They are preferably each formed of an upright medial plate portion 125 having a relatively flat plane inner face provided with track members 126. Reinforcing cross members 127 of substantially U shaped cross section are rigidly connected with the medial plate portions 125 and extend crosswise of the rear sides thereof at spaced apart intervals. Longitudinally extending web members 128 extend along the rear side of the medial plate portions 125 and through the cross members 127, as more clearly shown in Figs. 4, 6, 7, and 8. The medial plate portions 125 of the pendent frame members are provided with openings 129 positioned between the U shaped cross members, through which openings, liquid may be taken off, as hereinafter described. The outer ends of the U shaped cross members are provided with tie rod holes 130, as more clearly shown in Figs. 6 and 8. The pendent frame members 116, are shown as built up of a plurality of pieces welded together, but it will be understood that they may be cast in one piece, if the use permits.

Figure 5:
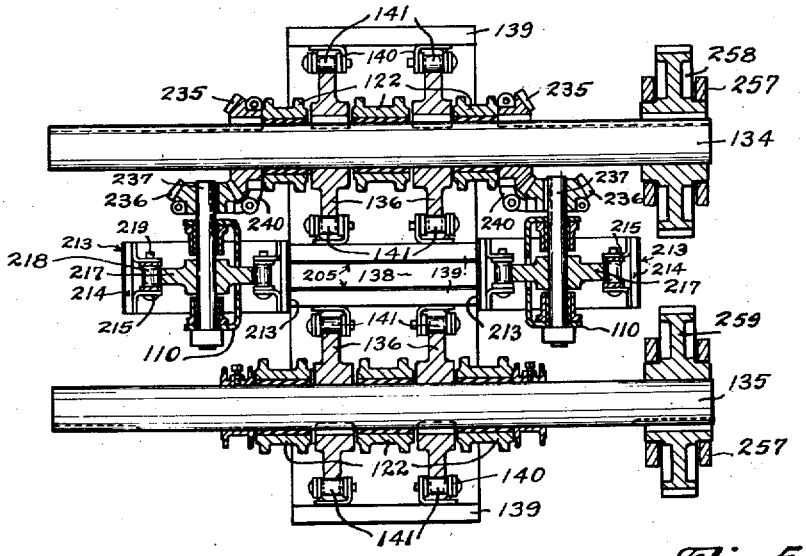
Figure 5 is a cross section substantially on broken line 5—5 of Fig. 3.

The bearing members 121 at the top ends of the pendent frames 116 support shafts 131 and 132 upon each of which shafts are mounted two spaced apart sprocket wheels 133. The lower bearing brackets 122 support shafts 134 and 135, upon each of which are mounted two spaced apart sprocket wheels 136. A greater or less number of sprocket wheels 133 and 136 may be provided on each of the respective shafts if desired. The lower sprocket wheels 136 are keyed to the shafts 134 and 135 as shown in Fig. 5 and the upper sprocket wheels 133 may be similarly keyed to their shafts 131 and 132.

Two endless slat belts are operatively mounted on the sprocket wheels 133 and 136 and are supported on the pendent frames 116 in such a manner as to cooperate with other parts in forming a pressure or filter chamber 138 having as two sides the two opposed and adjacent portions of said slat belts. This pressure or filter chamber 138 is wider at the top and converges toward the lower end in such a manner that material which is introduced at the top end will be subjected to increasing pressure as it moves downwardly through said chamber. The opposed portions of the slat belts which form walls of the pressure chamber 138 move downwardly in the operation of the machine.

The slat belts are formed of transverse slats designated generally by 139. These slats are secured to link belts 140 which run on the sprocket wheels 133 and 136. The link belts 140 have rollers 141, see Figs. 4 and 5, at the locations where the links of said belts are pivotally connected, which rollers run on the track members 126 and serve as an antifriction means for supporting the load carried by the moving slat belts due to the development of pressure in the pressure chamber 138. Roller or ball bearings of conventional type, not shown, may be provided internally of the rollers 140 to further reduce friction, if desired. The slats used in making up the slat belts and designated generally by 139 are strong members and may be adapted for supporting filter cloth means on their pressing face surfaces, and said slats are preferably provided with drainage means whereby filtrate expelled from material within the chamber 138 may readily pass outwardly through said slats. Several forms of these slats are shown in Figs. 18 to 30, inclusive. Where reference is made in this specification to top edge and bottom edge of these slats, it will be understood that these terms refer to the slats in the position in which they form the filter cloth supporting means or walls of the filter chamber, it being obvious that these slats are reversed in position as they pass around the upper and lower sets of sprocket wheels 133 and 136, respectively.

These slats have three important functions; first, they form supporting means to withstand the pressures which are exerted against the filter cloths or belts; second, they serve to collect and direct the liquid filtrate to a definite position; third, they serve to drain the filtrate promptly away from the filter cloth or slat face. In every case the cracks between the edges of adjacent slats slope downwardly and away from the filter chamber, due to the fact that the filter chamber is slightly wedge shape or convergent from top to bottom. This slope is greatly accentuated in the rhomboidal form of slat shown in Fig. 27.

Figure 30:
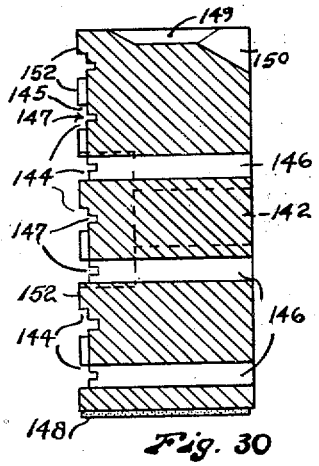
Figure 30 is a sectional view on a larger scale substantially on broken line 30—30 of Fig. 28.
Figure 28:
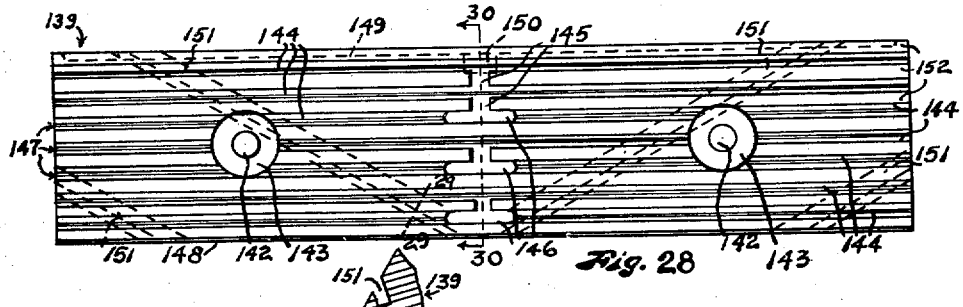
Figure 28 is a plan view of still another form of filter belt slat.
Figure 29:
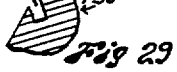
Figure 29 is a fragmentary cross section on broken line 29—29 of Fig. 28.

The slat shown in Figs. 28, 29 and 30 is one form of slat which may be used. This type of slat may be of non-metallic material, as of hardword made liquid proof by subjecting it to a hot paraffine bath. This slat has holes 142 for the reception of suitable bolts, not shown, by which said slat may be secured to the link belts 140. The holes 142 are counterbored as at 143 on the front side of the slat for the reception of the bolt heads. This slat 139 is further provided, on the side against which the filter belt is pressed, with spaced apart longitudinal grooves 144, which extend from the ends of the slat to a point near the center and are connected, by a transverse intersecting groove 145, with drain holes 146, which drain holes extend from face to rear of the slat and afford passageways through which filtrate may be passed through the slat, so that said filtrate may be picked up at the rear side thereof. Each groove 144 preferably has a saw kerf 147 in the bottom thereof so that if a filter cloth is pressed into the groove, the saw kerf will still afford a channel for the drainage of liquid to the holes 146. A packing member 148 in the nature of a thin flat piece of resilient material, as rubber, may be secured, preferably by cementing the same, to the bottom edge of each slat. These packing members tend to prevent leakage between the slats. The top edge of each slat is provided with a longitudinal recess 149 which communicates with a medially positioned transverse notch or groove 150, whereby any filtrate which enters the crack between the slats is drained to the center and discharged to the rear of the slat. The packing members 148 and recesses 149 and 150 are more clearly shown in Fig. 30, which is on a larger scale than Fig. 28. A plurality of grooves 151 are provided in the backs of the slats for the purpose of draining, toward the center of the slat, any filtrate which may escape the other grooves and trickle down the base of the slats. The grooves 151 are inclined downwardly from outer to inner ends and are cut at any angle as illustrated in enlarged detail, Fig. 29, whereby they will form channels in which the liquid may flow toward the center of the slats. When a filter cloth is pressed against the front side of this slat, said cloth will be supported by the lands or surfaces 152 between the grooves 144 and filtrate may be forced through said filter cloth into the grooves 144 and thence disposed of to the rear of the slats.

In Figs. 18, 19, 20 and 21 I have shown a metal slat 153 provided with internal cavities 154 having ribs 155 therebetween. The face side of the slat 153 is recessed to leave a narrow marginal portion 156 which projects beyond the plane common to the front edges of the ribs 155. The face of the slat may be formed by a relatively strong and heavy close-mesh wire screen 157, which fits within the recessed portion and is flush with the marginal portion 156. Tie wires 158, Fig. 21, may be used to secure the wire mesh face 157 in place. Holes 179 may be provided in the slat 153 to facilitate securing the same to a link belt. The wire mesh 157 serves as a support against which filter cloth may be pressed. Liquid filtrate which is forced through said filter cloth presses readily through said wire mesh into the cavities 154. The front edges of the ribs 155 may be notched as at 159 and 160, so that this liquid filtrate may flow from the cavities 154 to a centrally located discharge opening 161 and be discharged through the back wall of the slat where it is picked up by liquid filtrate pick-up mechanism, as hereinafter described. The top edge of the slat 153 has a depression 162 therein to catch liquid filtrate which finds its way into the space between the slats. A hole 163 extends from the bottom of this depression to the interior cavities of the slat, whereby liquid filtrate collecting in the depression 162 will be drained off through the slat. The top edge of each slat 153 is further beveled at the rear corner as at 164 to facilitate drainage of filtrate to the rear and the bottom edge of each slat has a groove 165 positioned directly over the beveled portion 164 of the next adjacent slat below, said groove 165 forming an edge from which liquid will tend to drip, and the bevel 164 tending to prevent this drip from running forwardly between the slats. Grooves 164', having the same purpose and function as the grooves 151 in Figs. 28 and 29 may be provided in the rear wall of the slat 153.

Figure 19:
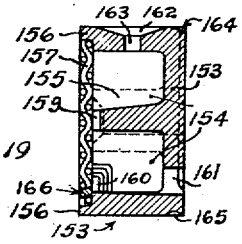
Figure 19 is a sectional view on broken line 19—19 of Fig. 18.

The space between the two lowermost horizontal wires of the wire mesh member 157 is preferably filled or otherwise blocked up or obstructed as shown at 166, Fig. 19, to thereby form a lip or dam to cause the liquid filtrate to flow rearwardly away from the wire mesh and to further prevent any residual filtrate from running back into the filter cloth as the slat moves away from the body of material which has just passed out of the pressure zone. A narrow ledge or dam 166' positioned just inside of the bottom edge of the slat face 157 may be used instead of the filling 166. Also, there may be provided a dam 156', whereby filtrate which trickles down the screen may be maintained away from the compressed solid matter of the material being treated forming the cake and positively directed to passageways 167, providing positive isolating for filtrate from the expanding vacuum-creating cake. Experience has taught that the filtrate tends to collect in the lower meshes of the filter face from which, unless provision such as dam 156' is provided, it is reabsorbed into the cake by the vacuum action of the expanding cake when the pressure is released. Passageways 167, Fig. 20, extend from the bottom of the screen 157 to the bottom edge of the slat, whereby filtrate may be drained into the depression 162 in the top of the next adjacent slat below. A vertical groove 168 is provided in each end of each slat 153 near the front side thereof and one or more holes 169 are provided in the bottom of each groove 168 and extend through the end wall of the slat to the space inside. When the slat is in use a filter cloth will extend around the end thereof, as more fully hereinafter described and shown in Fig. 17, and any liquid filtrate which is forced edgewise through this filter cloth may enter the groove 168 and pass into the inside of the slat through the holes 169.

Figure 20:
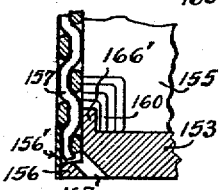
Figure 20 is a fragmentary sectional view substantially on broken line 20—20 of Fig. 18 illustrating details of the drainage means of the slat shown in Figs. 18 and 19.
Figure 21:
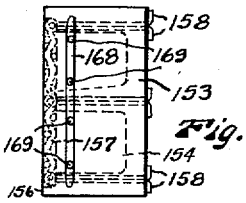
Figure 21 is an end view of said slat.

When a wire mesh face 157 is used on the face side of the filter slats, as shown in Figs. 18 to 21, it permits the liquid filtrate to pass freely through the filter cloths which are pressed against said wire mesh, but I find that the heavy pressures within the pressure chamber may stretch and even tear the filter cloth, by pressing it into the spaces between the wires. I overcome this tendency preferably by subjecting the wire mesh to a very high pressure to thereby flatten out said wire mesh before it is installed on the faces of the slats. The flattening of the wire mesh affords a flatter surface and more bearing area for the filter cloth and prevents injury of the filter cloth. This flattening of the wires is shown in Fig. 20.

Figure 26:
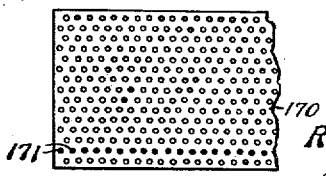
Figure 26 is a fragmentary elevation of a perforated plate which may be used on the filter belt slat shown in Figs. 18 to 21 in place of the wire mesh plate shown in said Figs. 18 to 21.

Fig. 26 shows a fragment of a perforated plate 170, which may be used on the slat 153 in place of the wire mesh 157. One advantage of this perforated plate 170 over the wire mesh 157 is that it affords a more even surface and there is less tendency to stretch a filter cloth which is pressed against the front of the slat. By omitting or filling one row of holes near the bottom edge of the plate 170, as shown at 171, the same result is obtained as by the use of the filter 166 in Fig. 19, a consideration particularly important where excessive pressures are employed.

Figure 22:
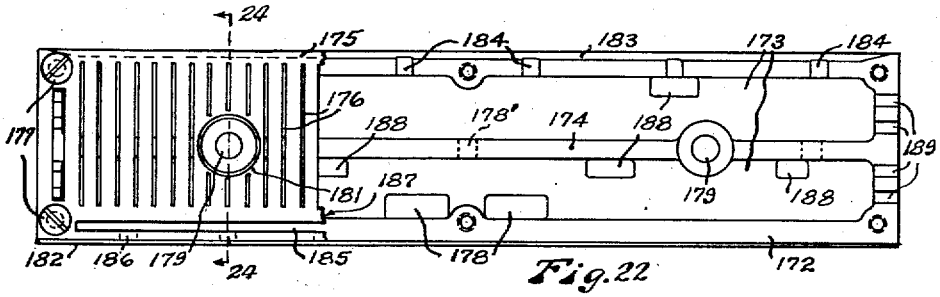
Figure 22 is a plan view with parts broken away of another form of filter belt slat in which a slotted plate is used on the face of the slat.
Figure 23:
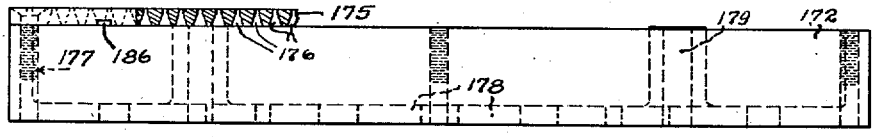
Figure 23 is an edge view of the slat shown in Fig. 22.
Figure 24:
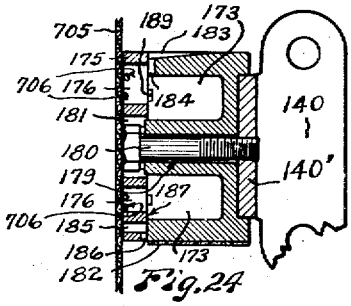
Figure 24 is a sectional view substantially on broken line 24—24 of Fig. 22.

The slat 172 shown in Figs. 22, 23, and 24 is also of metal construction and has cavities 173 on the inside into which liquid filtrate may pass. A rib 174 extends lengthwise within said slat 172 and is flush with the front edge of the slat. The face of the slat 172 is formed by a metal plate 175 which has slots 176 with rearwardly diverging walls and is secured to the slat 172 by screws 177. The slots 176 and the supporting surfaces between said slots are of suitable shape, size and positioning so that liquid filtrate which is pressed through a filter cloth, supported by the plate 175, will pass through the slots 176 into the interior cavities 173 of the slat and be discharged from the rear side of the slat through openings 178. Openings 178', shown by dotted lines in Fig. 22, may be provided in the rib 174 for filtrate to pass through. The slat 172 has holes 179 formed in enlarged portions of the rib 174 through which holes 179 bolts or cap screws 180 may extend for the purpose of securing the slats 172 to the link belts. The heads of the cap screws 180 are positioned in openings 181 in the plates 172 and may be flush with the front side of said plates 172, see Fig. 24. The bottom edge of each slat 172 may have a packing strip 182 cemented or otherwise secured thereto, which tends to exclude filtrate from the space between said slats. The top edge of each slat 172 may have a depression 183 communicably connected with the interior of the slat by notches 184 to catch any filtrate which finds its way between the slats and to direct said filtrate into the cavity within the slat. A horizontal slot 185 is provided along the bottom of the plate 175 to afford a means for receiving filtrate in a portion of the plate not otherwise provided with slots. The filtrate entering the slot 185 passes down through openings formed by notches 186 in the inner side of the plate and will ordinarily find its way into the cavities of the next adjacent slat through the depression 183 and notches 184. It will be noted, in Figs. 22 and 24 that the slots 176 terminate above the level of the bottom of the interior cavity 173 of the slat 172, and that the slot 185 is closed at the inner side by the edge of the slat, thereby leaving a lip or dam at 187 which corresponds in purpose and function with the lip or dam 166 in Figs. 18 and 20, previously described. Drain holes 188 are provided in the back of each slat 172, preferably just below the top wall and just below the rib 174 of said slat, to facilitate washing out, cleaning and sterilization of the interior cavities of said slats. It will be apparent that these drain holes 188 will be in a suitable position to allow all liquid to drain out of the slats when the position of the slats is reversed after said slats have passed around the lower sprocket wheels 133 at the beginning of their upward excursion and before they have passed around the upper sprocket wheels 136 at the beginning of their downward excursion. This washing out may be done by directing a spray of water through the slotted face of the slats as they are moving upwardly on the outer sides of the machine, said slats then being free from the filter cloth. The end walls of the slats 172 are notched at the front edges, as at 189, Fig. 24, to afford passageways through which liquid filtrate in the edges of a filter cloth which extends around the ends of said slats may flow into the slats. In Fig. 24 I also disclose a preferred method of mounting the links 140 on the slats by countersinking the base portion 140' of each link into the slat, whereby the ends of the link portion 140' will abut against solid metal shoulders in the slat and the tendency to shear off the bolts 180 will be greatly lessened.

The filter belts 705 (Fig. 24) contacting the slat faces 175 may be treated or impregnated to render them repellent to filtrate. An example of such a filtrate repellent material, when water constitutes the filtrate, would be a filter belt made of a fabric in which the threads had been treated or impregnated with paraffin. A filtrate repellent fabric or belt of this nature will cause the filtrate which collects in the holes or slots of the slat face 175 to form globules 706 when said filtrate is exposed to the vacuum suction action arising from the expanding cake when pressure is released. When filtrate is thus induced to assume the globular form, space is left between said globules for air to pass to relieve the vacuum like action without carrying said filtrate back into the filter belt and into the cake. Treating the slat faces with filtrate repellent material, such as aluminum stearate, also renders these faces repellent to the return of filtrate and helps to cause any filtrate in the passageways in said slat faces where experience teaches it naturally forms as a film, to assume a globular form and allow air to pass inwardly without carrying the filtrate back into the cake. Thus, either the filter belts or the slat faces or both may be treated with water repellent material. Among the metals, applicant has discovered that Duralumin is inherently less aqueous filtrate film forming than other metals.

Figure 27:
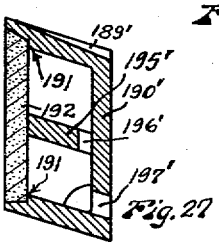
Figure 27 is a sectional view of still another form of filter belt slat in which said slat is of rhomboidal shape in cross section to afford walls which are inclined downwardly from the face to the rear of said slat to promote drainage of a liquid, and in which a plat of porous filter material is provided as a face at the front of the slat.
Figure 25:
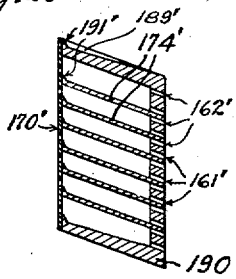
Figure 25 is a sectional view of a preferred form of filter belt slat of rhomboidal shape in cross section to afford walls which are inclined downwardly from the face to the rear of said slat to promote drainage of liquid.

Figs. 25 and 27 show cross sections of two hollow metal slats 190 and 190', respectively, of a preferred form of construction, said slats being of rhomboidal form in vertical cross section, the top and bottom of said slats being inclined downwardly and backwardly from the face of the slat to thereby promote rapid drainage of filtrate from face to back, both within the slat and between the respective slats in the filter zone. The said rhomboidal form of the slat has been found, by experience, to be a most important change in preventing the re-absorption of the expressed filtrate by the vacuum created by the expanding cake when the pressure is released and in increasing the efficiency of the machine as a whole. This is effected by providing for the prompt withdrawal of the filtrate from the filter face on the passage of the slat through the filter or pressure zone. Moreover, upon the upper excursion of the slat outside of the filter zone, the same rhomboidal form has the important advantage of shedding or discharging the residual filtrate cleaning fluid away from the machine, so that injury to the metallic parts of the machine is prevented. Particularly is this important when the filtrate is of a character detrimental to the materials of which the machine is constructed. The top walls of the slats 190 and 191' are each recessed as at 189' to provide sufficient space between the closely super-imposed slats to permit the drainage of the filtrate from the filter face to the rear of the slat, said space being necessary to prevent the blocking of the drainage by film production as otherwise results. The recessed portions 189' may be suitably sloped to deliver the filtrate thus drained to pick-up means at any desired location between the two ends of the slat. The inclined top and bottom walls of slats 190 and 190' cause filtrate to be removed quickly from the proximity of the filter belts, cloths, or filter faces and tend to prevent reabsorption of liquid by expanding solid material at the location where pressure is released. I find that there is a strong tendency for filtrate to be withdrawn from the slat and re-absorbed by the solid material after said solid material has passed the location of maximum pressure and has started to expand, said expansion exerting a vacuum like action. The slats shown in Figs. 25 and 27 minimizes this tendency by rapidly removing substantially all of the filtrate so that said filtrate has no opportunity to be thus drawn back and reabsorbed by the solid matter. Also in Fig. 25 I provide a relatively thin walled pervious slat face 170' which cooperates to permit prompt drainage by retaining a thinner film of the filtrate in the interstices of the permeable slat face. This thin slat face is preferably reinforced by a plurality of webs 174' which may parallel the top and bottom walls of the slat. The providing of a plurality of such web members also provides for an increased drainage surface to which the filtrate may adhere, thereby retarding the tendency of the filtrate to flow backwardly, due to the vacuum produced by the expanding cake when the pressure is released. Drainage ports 161' may be formed in the rear wall of slat 190' illustrated in Fig. 25 on the plane of each rib member 174'. The rib members 174' are preferably provided with relatively sharp and abrupt frontal edge portions 191' to act as a dam to retard the return of the filtrate to the said expanding cake due to the suction tendency occurring when the cake expands when the pressure is relieved. Ports 162' may be provided in the rear wall above ports 161' to admit air to relieve any vacuum created by the expanding cake without carrying the filtrate back into the cake and without interfering with the drainage of the filtrate through ports 161'.

The slat 190 shown in Fig. 27 differs in one respect from the slat 190' shown in Fig. 25 in that the front side of said slat 190 is recessed as at 191 for the reception of a slat face 192 which is formed of a plate or block of porous filter material. Also inclined rib 195' in Fig. 27 may have passageway 196' adjacent the rear wall to permit filtrate to pass downwardly to a discharge outlet 197'.

Figure 3:
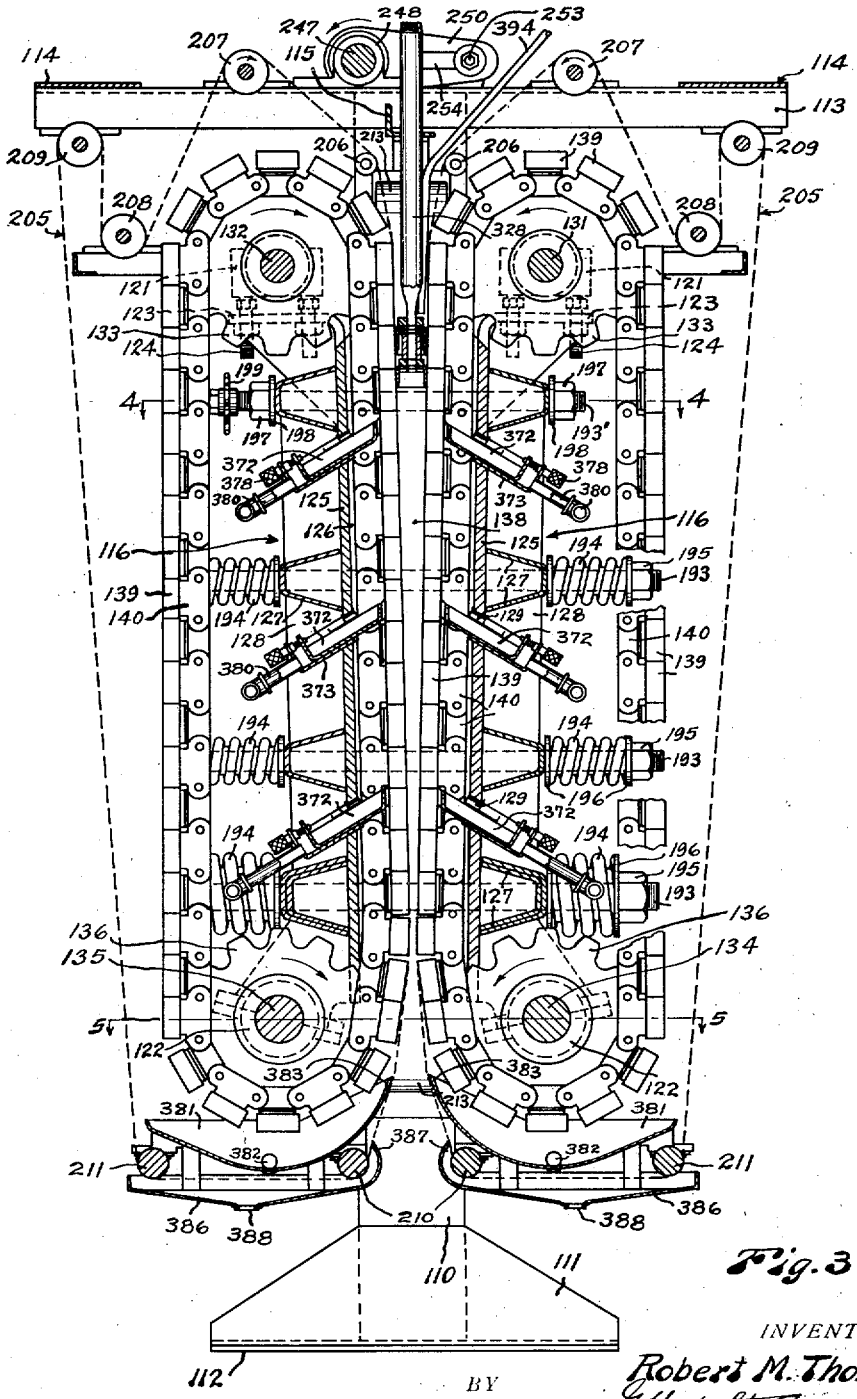
Figure 3 is a vertical section substantially on broken line 3—3 of Fig. 2.

The two pendent frames 116, Figs. 1 to 5 are connected with each other by a plurality of floatingly mounted tie rods 193, which extend through the holes 136 in the outer ends of the U shaped cross members 127. Relatively strong and heavy compression springs 194 may be provided on the floatingly mounted tie rods 193 at the outer sides of the U shaped cross members 127, and nuts 195 on the ends of said tie rods may serve as adjustable holding means for the springs 194. Suitable washers 196 may be provided at both ends of the springs 194. Due to the fact that the pressure between the pendent frames increases toward the lower end of the machine, I prefer to provide stronger floatingly mounted tie rod members and heavier springs toward the lower end. In Fig. 3, it will be noted that the lowermost springs 194 are made larger and heavier. Obviously more spring pressure may be obtained toward the lower end of the pendent frames by providing a greater number of springs, which may be done as hereinafter more fully described, with specific reference to Fig. 45.

By interconnecting the two pendent frames with the floatingly mounted tie rods 193 it will be apparent that the pressure of material in the pressure chamber 138 between the two pendent frames will be borne as a tension by said tie rods 193 and will not be transmitted to the stationary frame of the machine. This provides a balanced structure of great strength and minimum weight and affords a very advantageous construction for high pressure operation.

It will be noted that the uppermost tie rods 193′ which connect the two pendent frame members are positioned a short distance above the pivot screws 117 on which said pendent frame members are swingingly supported and that no springs are provided on these tie rods 193′. This is more clearly shown in Figs. 1 to 4 inclusive. The nuts 197 on these top tie rods are preferably non-rotatably secured to the cross members 127. This may be done by welding said nuts 197 to washers or plates 198 which are welded to the cross members 127. The tie rods 193′ each have right hand threads at one end and left hand threads at the other end, whereby rotation of said tie rods in one direction, within the relatively fixed and non-rotatable nuts 197 will cause the two pendent frame members to be moved toward each other and rotation of said tie rods in an opposite direction will cause said two pendent frame members to be moved away from each other, it being apparent that each pendent frame member will be moved the same amount toward or away from the medial vertical plane of the pressure chamber 138 in response to rotation of the tie rods 193′. To insure equal angular movement of the two tie rods 193′ in the same direction, I preferably provide a sprocket wheel 199 on each of said tie rods and I inter-connect said two sprocket wheels by an endless link belt 200, see Fig. 2. The tie rods 193′ may be turned by exerting a pull on the link belt 200, it being understood that these adjustments will be made when the machine is inoperative and when the pendent frames are not subjected to pressure, and that a small amount of power will suffice to turn the tie rods.

Suitable stop means, which may be in the nature of sleeve members 201 on the lowermost tie rod 193, are provided for limiting the movement toward the center, of the pendent frames. This prevents the slat belts on the pendent frames from being pressed together with the possibility of damaging the same when there is no material in the chamber 138 of the machine. These sleeve members 201 are shown in Fig. 1.

The slat belts which are carried on the two pendent frame members 125 serve as supports for woven or fabricated filtering members. Each fabricated filtering member may be in the nature of an endless filter cloth belt 205 for use in connection with each slat belt, as shown by broken lines in Figs. 1 and 3, or it may be in the nature of one or more straight strips of filter cloth material not in endless form, or it may be in the nature of a plurality of superimposed filter cloth strips or belts all as hereinafter described and shown in the drawings. The endless filter belts 205, shown in Figs. 1, 3, 4, 5 and 17 are wider than the slat belts and the edges 205′ of said filter belts fold over the ends of the slats 139 as shown in Figs. 4, 5 and 17. These filter belts 205 pass around rollers 206, 207, 208 and 209 at the upper end of the frame and around rollers 210 and 211 at the lower end of the frame, see Fig. 3. They are pressed against the slat belts by the material within the pressure chamber 138, and movement may be imparted to them by the slat belts. In Fig. 3 the filter belts are shown as passing over the guide rollers 206 just before they engage with the slat belts in their downward movement. In Fig. 44 I have shown a guide member 212 positioned at the side of the slat belt near the upper end thereof and serving to fold the edge of the filter belt at right angles, whereby the edge of the filter belt may be caused to fold correctly over the ends of the slats 139 as it passes into the pressure area of the machine.

Figure 9:
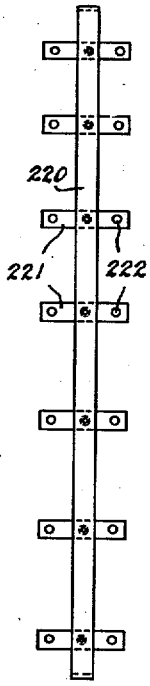
Figure 9 is a detached elevation of a frame rail used to support the impervious side belts of my machine.

Positioned at the sides of the previously described slat belts and in engagement with the portions 205′ of the filter cloths 205, which extend around the ends of the slats 139, are two side belts 213, preferably impervious and preferably of metallic character to provide low friction. These side belts form walls of the pressure chamber 138 and may be of duplicate construction. Each of the side belts 213 is carried on a slat belt composed of slats 214 secured to an endless link belt 215. The link belts 215 are mounted on upper sprocket wheels 216 and lower sprocket wheels 217, see Fig. 2, and said link belts 215 have rollers 218 provided on the pivot pins 219, which connect the respective links of said link belts, see Fig. 17. The rollers 218 may run on trackways 220, see Figs. 4, 9 and 17, which may be positioned opposite the sides of the pressure chamber 138 and extend between the upper and lower sprocket wheels 216 and 217, respectively. The trackways 220 support the link belts 215 and slats 214 and said slats 214 support the impervious side belts 213 in close liquid tight contact with the marginal portions 205′ of the filter belts 205, which marginal portions 205′ are folded over the ends of the slats 139 to provide a fluid tight joint between the ends of the slats and the side belts. The trackways 220 for the side belts may be supported by flat springs 221 which extend crosswise of said trackways 220 at frequent intervals, as shown in Figs. 4, 9 and 17. This track 220 is slightly flexible or resilient so that the same may be locally adjusted to make the joint between the side belt and the filter belts filter tight. The ends of the flat springs 221 have holes 222 for the reception of portions 223 of reduced diameter on the ends of cap screws 224, Figs. 4 and 17. The cap screws 224 are threaded through bosses 225 on the upright side frame members 110, see Fig. 4, and may be adjusted to vary the pressure of the side belts 213 against the ends of the slats 139 of the main slat belts to make the joints of desired tightness. The flat springs 221 are provided at frequent intervals and are adjustably supported at each end, thereby making it possible to adjust the position of the side belts 113 at any desired location to maintain liquid tight contact with the filter cloths and the main slat belts. In Fig. 46 I have shown a modified form of adjustable spring mechanism for supporting the side belts. In this disclosure the trackway 220 has a plurality of rearwardly projecting studs 226, only one of which is shown, that extend through holes in a side frame member 227, which corresponds to the side frame members 110. The end of each stud 226 has a cap 228 which engages one end of a compression spring 229. The other end of the compression spring 229 abuts against a member 230 on a cross bar 231. The ends of the cross bar 231 are adjustably supported by cap screws 232, which are threaded through a plate 233, which plate is welded or otherwise fixedly secured to the frame member 227, as indicated at 234. The compression of the spring 229 may be adjusted by adjusting the cap screws 232. The helical springs 229 afford a greater range of movement than the flat springs 221 and are less liable to become permanently deformed. Also, in Fig. 46 a channel shaped reinforcing member 227' is provided within the frame member 227. This may be done in connection with the frames disclosed in the other figures where greater strength is required. This structure, together with the plate 233 was found in practice to be very important in reinforcing the stationary frame to withstand the increased driving strains due to excessive pressures developed in the handling of certain materials. In Fig. 46 I also show a metal side belt 213' having perforations 212' to afford drainage through said side belt.

The filter cloths 205 and side belts 213 may form four walls of the pressure chamber 138 and the engagement of the side belts 213 with the filter cloth portions 205' which are folded over the ends of the slats 139 affords liquid tight joints at the corners of said pressure chamber. The filter cloths 205 and impervious side belts 213 move at the same rate of speed, so that there will be substantially no slippage or friction between the contacting portions of said filter cloths 205 and side belts 213 as respects their vertical movement. The slat belts, which support the filter cloths, may be driven, as hereinafter explained. The side belts 213 frictionally engage the filter cloth portions 205' at the edges of the main slat belts and may be driven by this frictional engagement. It is preferable, however, to provide a more positive driving connection between one of the lower driven shafts 134 or 135 and the lower sprocket wheels 217 on which the side belts are mounted. This drive, one form of which is shown generally in Fig. 5, and a more complete form of which is shown in detail in Figs. 42 and 43, may be in duplicate for each side belt 213, and may consist of a bevel gear 235 keyed or otherwise fixedly secured to one of the lower main shafts, as to the shaft 134, and meshing with another bevel gear 236 on the shaft 237. The shaft 237 has a sleeve 238 upon which the lower sprocket wheel 217 for the side belt 213 is mounted. The bevel gear 236 is splined on the shaft 237 as by a key 239, whereby it may be moved lengthwise thereon in response to swinging movement of the lower end of the pendent frame in which the shaft 134 is carried, the swinging movement of said pendent frame being ordinarily a relatively small amount. An L shaped yoke or bracket 240 connects the hub portions of the two bevel gears 235 and 236 and insures proper meshing of said bevel gears. The sleeve 238 is rotatably mounted on the shaft 237 and has a driving connection therewith through a friction clutch in the nature of two plates 241 and 242 secured respectively to the shaft 237 and the sleeve 238 and having friction material 243 therebetween. A compression spring 244 interposed between one end of the sleeve 238 and a fixed collar 245 on the shaft 237 resiliently maintains driving contact between the two plates 241 and 242, but permits a relative slippage therebetween in the event of an excessive load. A self aligning bearing 246 is provided for the sleeve 238, said bearing being self aligning to compensate for the change in position of shaft 237 (*a*) incident to the pendent mounting of the frame 110 in which said shaft is journaled and (*b*) incident to movement of said pendent frame due to reaction of the driving mechanism. The housing for the bearing 246 is secured to the adjacent portion of side frame member 110.

In Fig. 48 I have shown a form of the invention in which the side belts 215 are entirely dispensed with, and a flat plate 520 of impervious material having a very smooth surface on the side next to the pressure chamber and having a low coefficient of friction is substituted in place of each of said side belts. In this type, the edge portions 205' of the filter belts 205 slide upon the impervious side plates 520. The side plates 520 have dowel pins 521 secured thereto, which fit slidably within suitable holes in the side frame member 110 and in a plate 522, which is welded or otherwise rigidly secured to said side frame member 110. The plate 520 is resiliently supported against outward movement by cross springs 523 having bearing means 524 engaging the plate 520 at the two ends of each spring. The springs 523 are adjustably supported midway between their two ends by cap screws 525. Access to the heads of the cap screws for the purpose of adjustment is had through holes 526.

The main shafts 134 and 135 may be driven in various different ways, but I find the ratchet type driving mechanism shown in Figs. 1 to 5, inclusive, to be very well adapted for this use. This ratchet driving mechanism is shown on one side of the machine only, but it may be in duplicate on both sides of the machine if desired. It comprises a main driving shaft 247 rotatably mounted in bearings 248 on top of the frame of the machine and provided on one end with a sprocket wheel 249 by which it may be connected with a suitable source of power, not shown. The shaft 247 has a crank 250 secured thereto and connected by a single link 251 with a pair of toggle links 252. The pivot 253 by which the link 251 is connected with the crank 250 extends through a slot 254 in said crank and is adjustable along said slot 254 to vary the length between the center of the shaft 247 and the pivot 253, thereby affording an adjustment for varying the stroke of the link 251. As the link 251 is reciprocated the common pivot 255 of the link 251 and toggle links 252 will be moved up and down, and the angle between the toggle links 252 will be correspondingly varied. The outer ends of the toggle links 252 are connected by pivots 256 with the upper ends of lever arms 257. The lever arms 257 are fulcrumed on the hubs of ratchet wheels 258 and 259, which ratchet wheels are secured on the main shafts 134 and 135, respectively. Said lever arms 257 are preferably each formed of two pieces spaced apart at their lower ends to afford room therebetween for the ratchet wheels 258 and 259. The ratchet wheels are keyed or otherwise fixedly secured to the respective shafts 134 and 135. Upper pawls 260 and lower pawls 261 are preferably provided on each lever arm 257 for engagement with the respective ratchet wheels 258 and 259. The upper pawls 260 may be held in engagement with the respective ratchet wheels by their own weight. The lower pawls 261 may be extended beyond their pivots 262 and have heavier portions 263 formed on said extended portions, whereby said lower pawls 261 are held in engagement with the ratchet wheels by gravity exerted on the heavier portions 263. Manifestly only one pawl may be provided on each lever if desired. Obviously, vertical movement of the common pivot 255 of the toggle links 252 will impart a swinging movement to the levers 257, thereby causing the pawls 260 and 261 to ride over the teeth of the ratchet wheels 258 and 259 when the upper ends of the levers are moved outwardly away from each other, and to engage with the teeth of said ratchet wheels and advance said ratchet wheels in the directions indicated by the arrows when the upper ends of the levers are moved inwardly toward each other. This will impart an intermittent downward movement to those portions of the slat belts, side belts and filter cloths which form the walls of the pressure chamber 138. The above described ratchet means constitutes an efficient intermittent drive when used on one side only of the machine. If duplicate ratchet drive means is provided on the opposite side of the machine then the two cranks on the main drive shaft 247 may be positioned substantially diametrically opposite to each other whereby they will operate alternately as respects the driving and idling strokes, one set of said ratchet means always moving in the opposite direction from the other set, thereby producing an intermittent drive with very short periods of rest between successive advance movements.

With the ratchet drive hereinbefore described it would be possible to move the two ratchet wheels through unequal angles at the same stroke unless some means is provided for compelling an equal angular movement of the levers 257 each time the toggle link pivot 255 is moved upwardly or downwardly. The means for compelling equal angular movement of the levers 257 at each stroke may be in the nature of limit means for predetermining the end of the stroke of each lever or it may be in the nature of guide means for insuring equal angular movement of the levers throughout all portions of their entire stroke, which various means will now be described. In Figs. 1 and 2 I have shown one limit means for bringing each lever to the same position at each end of each stroke. This limit means, which is in duplicate in connection with each lever 257, consists of a rod 264 adjustably secured by nuts 265 to a fixed frame bracket 266. The rod 264 extends slidably through a block 267 which is pivotally secured to the lever 257 and said rod has two collars 268 and 269 adjustably secured thereon and positioned so that one collar 268 limits the inward swinging movement of the lever 257 due to contact with block 267 and the other collar 269 limits the outward swinging movement of the lever 257 due to contact with block 267. This allows freedom of movement of the levers 257 between the two limits but insures that each lever will always be brought to a stop at the same location at the respective ends of each stroke.

Figure 32:
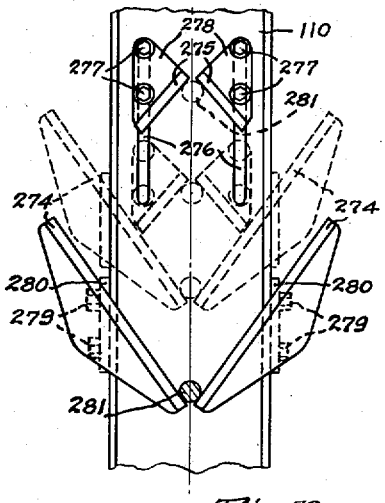
Figure 32 is a detached fragmentary elevation illustrating one centering means which may be used in connection with the ratchet drive.

Another limit means for insuring a proper positioning of the lever arms 257 at the ends of the stroke is shown in Fig. 32. This means consists of a pair of convergent lower positioning members 274 adjustably secured to a side frame member 110 so that they form a V-shaped trough with its vertex preferably positioned in the medial vertical plane of the frame member 110 and a pair of upper convergent positioning members 275 also adjustably secured to the side frame member 110 so as to form an inverted V-shaped trough positioned with its apex directly above the vertex of the lower trough formed by members 274. The upper positioning members 275 may be made adjustable by providing vertical slots 276 in the frame member 110 and securing said positioning members by means of bolts 277 which pass through said slots and through flanges 278 on the upper positioning members 275. The lower positioning members 274 may be adjustably secured to the upright frame member 110 by bolts 279 which extend through flanges 280 which are rigid with said lower positioning members 274 and through slots, not shown, which correspond to the slots 276. The upper and lower positioning members may be spaced further apart, as shown by full lines, when a long stroke of the driving mechanism is used or they may be moved closer together, as shown by broken lines, when a short stroke of the driving mechanism is used. When the positioning members 274 and 275 are used I provide an inwardly directed extension 281 on the pivot 255 by which the upper link 251 is connected with the toggle links 252. This extension occupies a position in the vertex of the lower guide members 274 at the lowermost limit of its stroke and in the apex of the upper guide members 275 at the uppermost limit of its stroke. It will thus be apparent that the pivot 253 will be guided to the same position each time, at the upper end of its stroke and at the lower end of its stroke thus insuring equal angular movement of the two ratchet levers 257 and equal angular movement of the two ratchet wheels 258 and 259.

Figure 33:
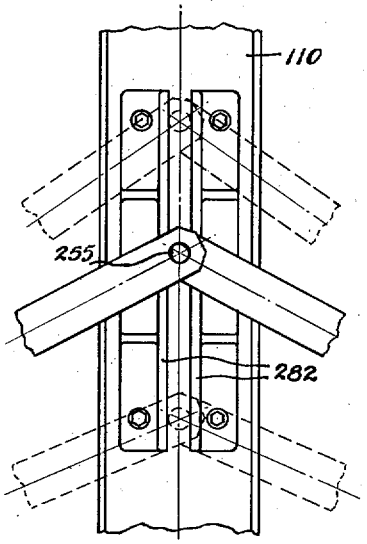
Figure 33 is a detached fragmentary elevation of other centering means for the ratchet drive.

In Fig. 33 I have shown means for guiding in a straight line the common pivot 255 of the toggle links 252 and main link 251 in such a manner that equal angular movement of the ratchet levers 257 is maintained for all parts of the stroke in both directions. This means comprises two vertical guide members 282 secured to the side frame member 110 in spaced apart relation for the reception therebetween of a suitable extension, not shown, which may be a part of the pivot member 255. Obviously, these guide members 282 will always compel a straight line motion of the pivot 255, thereby always compelling equal angular movements of the two ratchet levers 257 for all positions.

Figure 31:
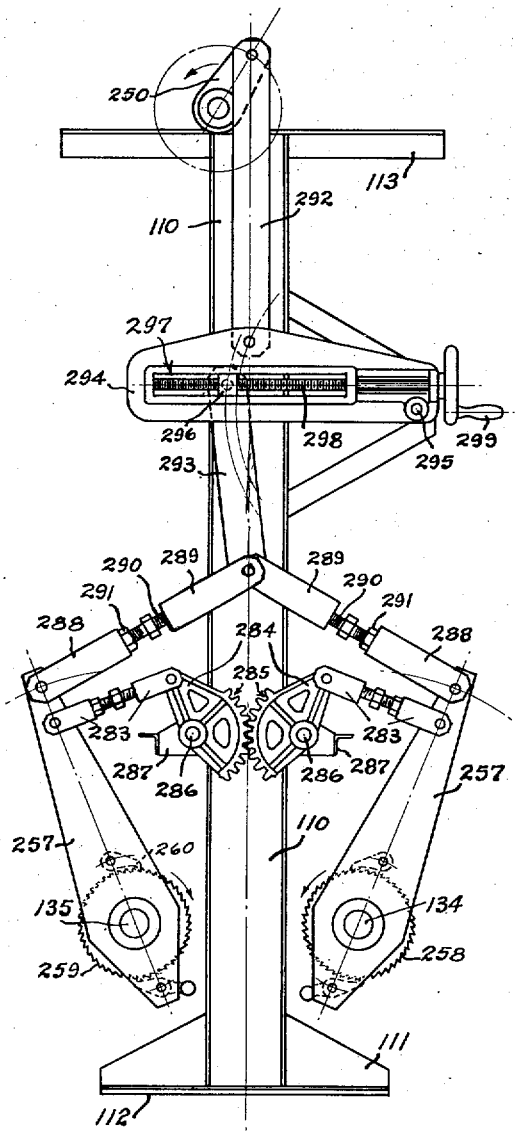
Figure 31 is a detached elevation illustrating one means for varying the speed of the ratchet drive and one means for compelling an equal travel of each ratchet arm.

Another means for always compelling equal angular movement of the ratchet levers 257 is shown in Fig. 31 in which said ratchet levers 257 are connected by links 283 with gear segments 284 respectively, said gear segments having relatively intermeshed gear portions 285 of the same pitch diameter, whereby said gear segments will always be compelled to move equal angular distances in opposite directions. The gear segments 284 are mounted for oscillating movement on pivots 286 which are secured to frame brackets 287. The inner ends of the two links 283 are connected with the segments 284 at equal distances from the pivots 286 and the outer ends of said links 283 are connected with the ratchet levers 257 at equal distances from the centers of shafts 134 and 135 so that equal angular movement of the ratchet levers 257 in opposite directions is always compelled.

Figure 31 also shows adjustable length toggle links connected with the upper ends of the ratchet levers 257, each of said toggle links comprising two link members 288 and 289 connected by threaded bolt means 290 having a lock nut 291 thereon. Similar adjusting means is provided in links 283. By adjusting the length of the toggle links 288—289, and the length of the links 293, the angular movement of the levers may be varied, and the pawls on said levers may be brought into proper registration with the ratchet teeth. In Fig. 31 I have also shown an alternative means for varying the length of stroke of the driving link which is connected with the toggle links. This consists in providing two driving links 292 and 293 which are connected with each other through an intermediate member in the nature of a horizontally disposed swinging arm 294 which is pivoted as at 295. The upper link 292 may be pivotally and non-adjustably connected with the crank member 250 and with the horizontally disposed swinging arm 294 in such a manner that the same angular movement will always be imparted to said horizontally disposed swinging arm upon rotation of the crank member. The upper end of the lower link member 293 may be pivotally connected with a block 296 which is adjustable in a longitudinal slot 297 in the horizontally disposed swinging arm 294 by means of a screw 298 which may be turned by a crank member 299. Obviously, moving the pivotal connection 296 of the lower link 293 toward the pivoted end of the horizontally disposed arm 294 will shorten the stroke of the link 293 and moving the pivotal connection 296 of the link 293 in the opposite direction toward the non-pivoted end of the horizontally disposed arm 294 will lengthen the stroke of said link.

In Fig. 41 I have shown another modified form of ratchet drive means in which two crank shafts 300 and 301 are rotatably mounted in side by side spaced apart relation on the upper portion of the frame of the machine and are geared together by enmeshed gear wheels 302 and 303, each having the same number of teeth, whereby said shafts will be caused to rotate at the same angular velocity in opposite directions. The shafts 300 and 301 are provided with cranks 304 and 305 respectively which are connected by relatively crossed links 306 and 307 with the ratchet levers 257. As the shafts 300 and 301 are rotated the ratchet levers will be oscillated in an obvious manner between the limits indicated by broken lines in Fig. 41. This type of ratchet drive dispenses with the toggle links and provides means for compelling equal angular movement of both of the ratchet levers 257 throughout all portions of their stroke.

In the above, mechanism has been described for providing for equal and corresponding uniform rate of travel of the belts inter se, even though said travel be discontinuous. However there are materials which are better handled or positively require unequal rate of travel of the various belts. This is necessary to provide a working of the material, i. e., for some materials it is advantageous to have one of the pervious belts move at a different rate than the other. The ratchet driving mechanism is particularly advantageous in that it provides readily for this differential movement in the belts. Obviously, it is only necessary to adjust the stroke limiting means of the type shown in Fig. 31, so as to have a pawl of one lever arm pick up a different number of teeth at each stroke than the pawl on the other lever arm.

When the machine is used as a filter press for handling liquids, then means in the nature of a substantially liquid tight plug top closing member or packing member may be provided at the upper end of the pressure or filter chamber 138. This plug top closing member or packing member may take the form shown in Figs. 3, 13, 14, 15 and 16; or the form shown in Fig. 12. Supporting means for a plug top closing member is more clearly shown in Fig. 40.

I will now describe the several devices which may be used as plug top closing member in connection with the handling of liquids.

Referring to Figs. 3, 13, 14, 15, and 16, I show a double plug top closing member composed of an upper cup like rectangular member 315 and a lower cup like rectangular member 316, each formed of relatively resilient or flexible material, as rubber or like functioning material. Each of said cup like members has a piece 317 of very thin flexible material preferably metal having a low coefficient of friction fitted over the exterior thereof and another piece 318 of thin flexible material fitting within the inside thereof, said pieces 317 and 318 being respectively shaped to fit the external and the internal contour of the cup like members and extending substantially from one end to the other of the same, the outer piece 317 preferably terminating short of the lower edges of the cup like members. The inner piece 318 may terminate short of the lower edges of the cup like members, or may extend to or below said lower edges of said cup like members, so as to function as internal supporting and expanding means for the cup like members 315 and 316. Perforations 319 may be provided in the inside flexible metal member 318 to allow internal pressure to act directly on said cup like members 315 and 316.

A non-flexible metal supporting member 320 is provided within each cup like member 315 and 316 and a non-flexible metal cap 321 is provided on the top of each of said cup like members. A metal spacer member 322 is provided between the two cup like members, said spacer member resting on the metal cap 321 of the lower cup like member and being separated from the internal metal supporting member 320 of the upper cup like member 315 by a resilient spacer strip 323. Screws 324 extend from the inside of the lower cup like member 316 upwardly through parts 320, 318, 316, 317 and 321 and are screwed into the spacer member 322 thus forming a means for securing these parts in assembled relation with the lower cup member 316 secured to the spacer member 322. In a like manner, cap screws 325 extend downwardly through a metal plate 326 on the top of the upper cup member 315 and through parts 321, 217, 315, 318, 320, and 323 and are threaded into the spacer member 322, thereby securing the several parts which are associated with the upper cup member in assembled relation and also securing the same to the spacer 322. The spacer member 322 thus serves as a means to which both the upper and lower cup like members 315 and 316 are secured and by which they are supported in spaced apart relation. The resilient strip 323 permits desirable flexibility between the spacer member 322 and the upper cup member, thereby affording an ample amount of automatic adjustment as to position between the upper and lower cup members 315 and 316 for most efficient operation. The holes in the metal plate 326, through which the cap screws 325 extend, are preferably slightly larger than the cap screws, as indicated at 327, to contribute to or permit this flexibility. The flexibility thus afforded between the two cup like members 315 and 316 allows these cup like members to conform more accurately to the belt surfaces with which they contact and to maintain a more nearly fluid tight seal. An upright tubular liquid inlet member 328 may be secured to the metal plate 326 and communicates with a passageway 329 which extends down through both cup members 315 and 316 and intermediate parts and affords a liquid tight connection between the tubular inlet member 328 with the pressure chamber 138, as shown in Fig. 3. A smaller tube 330 may be connected with the plate 326 and may communicate by a passageway 331 with the pressure chamber formed below the two cup members. This tube 330 may extend upwardly to a suitable location for any desirable purpose, as for instance, it may be connected with a relief valve or a pressure gauge, not shown, or it may be connected with both. The cup members 315 and 316 are preferably molded to the correct shape to fit the walls of the pressure chamber 138, which may be formed by the filter cloth members 205 and the metal belts 213 and said cup members are provided with protruding corners 332 which fit into the corners of the pressure chamber formed at the location where the filter cloths 205 make the right angle bend around the ends of the slats 139 and at the same time contact the metal side belts 213. For the purpose of holding the corners 332 out in the corners of the pressure chamber, I provide a forked spring 333, Fig. 16, formed of spring wire having a loop secured under the head of the end screw 324 and having forked positions which lie within and press against the corners of the resilient cups 315 and 316 and exert an outward pressure in said corners. A thin piece of resilient metal 334 is provided within the ends of the cups 315 and 316. The piece 334 may be in the nature of extensions on the ends of the thin inside metal pieces 318 and correspond in purpose and function to the parts 318.

Figure 13:
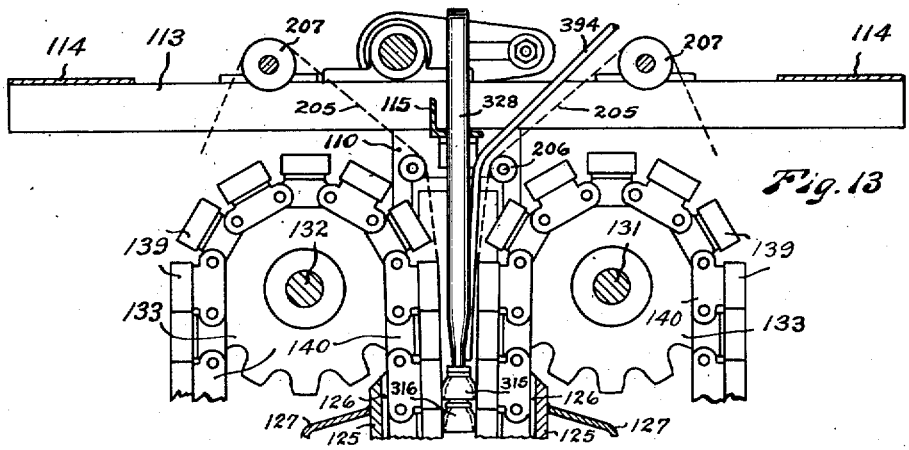
Figure 13 is a fragmentary view partly in section and partly in elevation of the upper portion of my press and filter press, showing a preferred form of packing plug means in end elevation.
Figure 14:
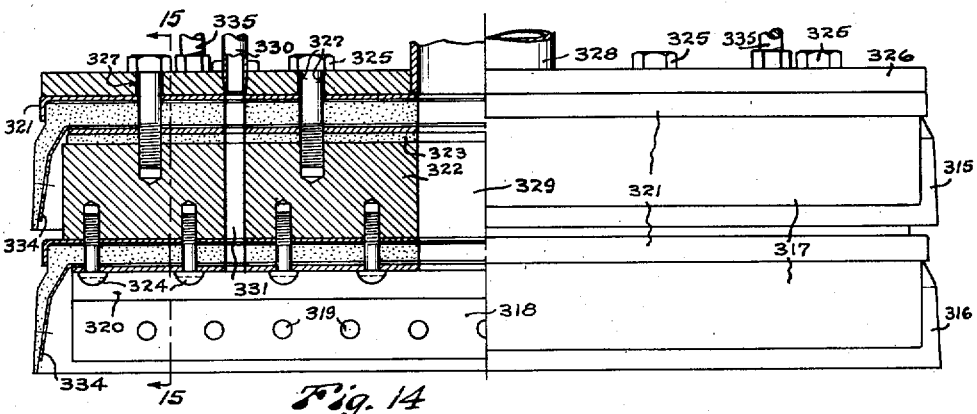
Figure 14 is a detail view partly in elevation and partly in longitudinal section of a preferred form of multiple packing plug used in my machine.
Figure 16:
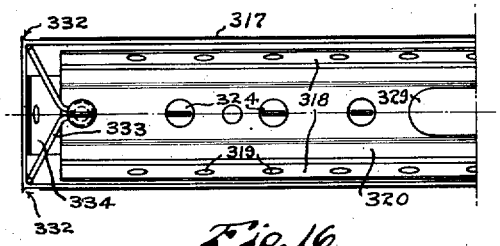
Figure 16 is an inverted fragmentary plan view of one of the packing plugs shown in Figs. 14 and 15.
Figure 15:
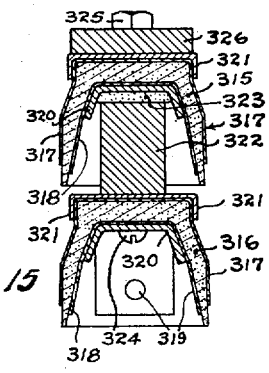
Figure 15 is a cross section substantially on broken line 15—15 of Fig. 14.

The filter tight plug top closing member formed by the two cup members 315 and 316 is supported within the wider upper end of the pressure chamber in the position shown in Figs. 3 and 13 and forms a substantially filter tight contact with the moving walls of said pressure chamber which makes it possible to build up and maintain a relatively very high pressure within said chamber, so that a very dilute material, such as occurs in the manufacture of yeast, where the bodies or solids to be separated out are of microscopic dimension, will be held within a substantially fluid tight chamber. It will be noted that the said cup like members are narrower at the top and wider at the bottom, and that the lower portions of said cup like members are the parts which make a sealing contact with the moving filter cloths and belts, so that a sealing contact with low friction is afforded, said contact being like the contact made by a cup packing in a pump. Obviously, the upper cup like member 315 will be somewhat larger than the lower cup like member 316 to conform to the convergence of the filter chamber.

The cup like members 315 and 316 are supported preferably by two rods 335, Fig. 40, which are secured to the metal top plate 326 and extend upwardly and are connected with the transverse angle bar 115, see also Fig. 3, at the top of the frame. To permit floating adjustment of the plugs I preferably allow a limited amount of gyratory movement of the two rods 335 where they connect with the angle bar 115. This may be done by providing relatively large holes 336 in the angle bar 115 and by providing, on the rods 335, nipples 337 of somewhat smaller diameter than the holes 336 and positioned within said holes. The length of the nipples 337 is greater than the thickness of the flange of the angle bar 115 through which they extend and the rods 335 have nuts 338 thereon, arranged to screw tightly against both ends of the nipples, whereby the rods 335 will be loosely and flexibly connected with the angle bar 115, thereby allowing for floating movement of the two cup like members 315 and 316, whereby said two cup like members will assume the correct position relative to the moving filter cloths and metal belts with which they contact, thereby assuring a tight and conforming fit.

The conduit member 328, Fig. 40, may also extend through the angle bar 115 and is preferably provided with a flexible section 339 to afford floating movement to the plug members.

In operation the providing of an efficient plug has proven one of the very difficult problems. Care must be taken to confine or maintain an excess of the hydrostatic pressure of the material being treated upon the inner walls of the cup like plug members in order that a fluid seal may be assured. The plug construction above set forth has been found to meet the problem arising in the environment of heavy pressures and moving belts, even as occurs in handling materials where the solid part is of microscopic dimensions, for example, yeast, in the filtering process of which hydrostatic pressures in excess of one hundred pounds per square inch are used. It must be remembered that the filter cloth often is a member of relatively delicate construction and undue friction thereon must be avoided to prevent undue wear where relatively high pressures are involved. Gradually after continued operation, some of the solid parts of the material being treated, find their way past the lower cup and lodge in the recess between the lower and upper cup, forming a mass in said recess. This mass helps in establishing the seal. The structure herein thus takes advantage of providing for utilizing a mass of the material being treated above the lower plug to assist in forming the seal.

Figure 12:
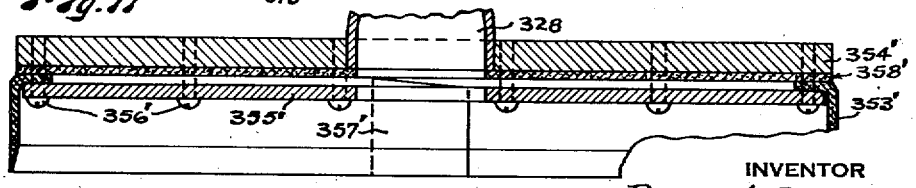
Figure 12 is a detached cross section of a cup like packing plug used in the upper portion of my pressure chamber to form a seal against the escape of liquids, a leather packing cup being shown.

Fig. 12 shows still another modified form of plug top closing member in which the upper edges of a cup member 353', which may be formed of pliable material, as leather, are secured between a cap 354' and an internal retainer 355', said cap and retainer being connected by screws 336'. In this construction the material of which the cup member 353' is formed is preferably lapped and sewed at both sides, as indicated at 357', and a strip 358' is preferably placed between the edges of the cup member 353' and the cap 354'. In a general way, the operation of this plug top closing member is similar to the operation of the previously described plug members. The character of the material of which the plug top closing member is formed will, of course, be governed by the character of the material being separated, so that destructive chemical interaction therebetween will be avoided. Also, the particular form of the plug top closing member to be used will depend upon the character of the material to be separated and the hydrostatic pressures to be retained.

Plug top closing members of the several types described in the preceding paragraphs very efficiently provide for a fluid tight pressure chamber and render successful the operation of the machine as a filter press where relatively excessively high pressures are developed, however, there is always a possibility of some leakage upwardly past the plug. To take care of such leakage I may provide a suction take off pipe 394 which extends into the top end of the machine and terminates near the top of the plug top closing member to draw off any liquid which may pass upwardly around the sides of the plug top closing member, see Figs. 3 and 13. The liquid thus drawn off may be returned to the pressure chamber. Otherwise this unfiltered liquid may overflow and find its way into the filtrate collecting means and contaminate the filtrate.

Figure 6:
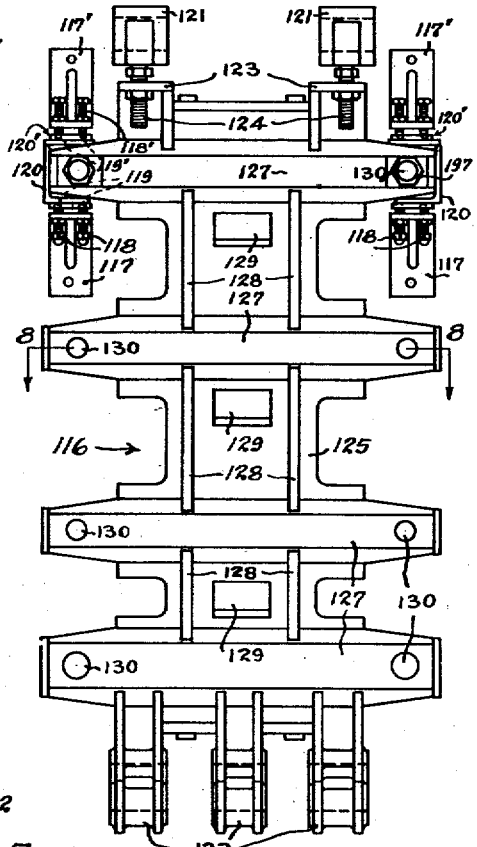
Figure 6 is a detached elevation from the outer or rear side of the frame of one of the main pendent press members.

For the purpose of collecting or picking up liquid which is expressed from the filter chamber, and discharged through the slat belts, I have provided holes 129 in the pendent frame members 116, as more clearly shown in Figs. 3 and 6 and have further provided liquid pick-up trays for insertion through these holes to receive the liquid which is discharged through the slats. In addition to these trays I also provide catch pans, of a form hereinafter described, at the bottom of the machine.

Figure 10:
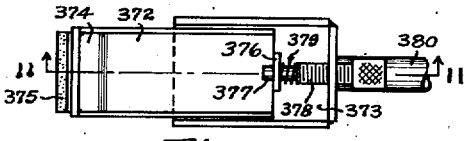
Figure 10 is a detached plan view of a filtrate pick-up device used in my invention.
Figure 8:
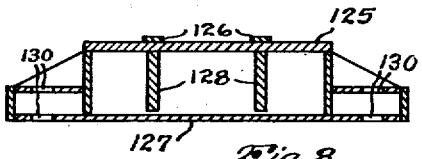
Figure 8 is a cross section substantially on broken line 8—8 of Fig. 6.
Figure 11:
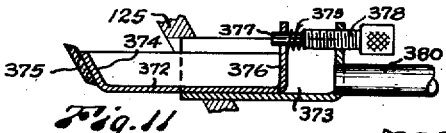
Figure 11 is a sectional view substantially on broken line 11—11 of Fig. 10.

The liquid pick-up trays, more clearly shown in Figs. 3, 10 and 11 each comprise an inner tray member 372 slidable within an outer tray member 373. The inner tray member 372 has an inclined front edge 374 which may be provided with a slat contacting strip 375, preferably of flexible material, as leather. Said tray member 372 is open at the rear end except for an upstanding lug 376 through which a shank 377 on the end of a supporting screw 378 slidably extends. A compression spring 379 on the shank 377 exerts a resilient pressure against the lug 376 tending to keep the tray member 372 pressed against the rear sides of the slats of the main slat belt. The screw 378 is threaded through the rear wall of the outer tray member 373 and serves as a means whereby the pressure of the spring 379 may be adjusted. The outer tray member 373 is open at the front end and has a take off pipe or conduit 380 connected with the rear end thereof. The take off pipes 380 from the several tray members may extend to any suitable receptacle or manifold (not shown) to which the filtrate is to be delivered.

In addition to the filtrate pick-up means described in connection with Figs. 3, 10 and 11, I provide, at the bottom of the machine, two curved pans 381, Fig. 3, of large enough size to receive any drippings from the slat belts as said slat belts are passing around the lower sprocket wheels 136. These pans 381 have liquid outlets 382 and have front edge portions 383 which engage with the surfaces of the filter cloths after said filter cloths leave the slats to thereby scrape off and pick up any liquid which may adhere to said filter cloths. The filter cloth belts 205 each pass around rollers 211 and 210 at the bottom of the machine and other pans 386 are provided beneath these rollers to pick up any liquid which may drip from the filter cloth belts. The pans 386 have curved lip portions 387 which engage the filter cloth belts 205 and scrape off any solid matter which may tend to adhere thereto. Liquid outlet means 388 is provided in the bottom of each pan 386.

For the purpose of compelling equal movement of the two pendent frames 116 toward and away from the medial vertical plane of the machine as adjusted for operation, I provide duplicate guide means, Figs. 1 and 2, at each side of the machine. Each set of guide means may comprise two link members 389 and 390, having their lower ends connected by a common pivot 391 with a cross head 392 which is guided for vertical movement between two spaced apart vertical guide members 393. The upper ends of the links 389 and 390 are pivotally connected, respectively with the shafts 134 and 135, see Fig. 2, thereby forming an efficient means for compelling equal lateral movement in opposite directions of the two pendent frames throughout the pressure zone. This means compelling equal movement of the pendent frames each side of the medial vertical plane of the pressure chamber 138 overcomes the danger of the downwardly moving side belts 213 from being pushed sideways by the pendently mounted frames acting through the main slat belts 139, which might result in the event of unequal inclination of said slat belts to the medial vertical plane of the machine. It will be understood that as the slat belts 139 travel downwardly, they also are moving across the face of the metal belts 213 due to the convergence of the pressure chamber 138. Accordingly, any unequal angle of travel of the slat belts 139 in response to the movement of the pendent frames would result in forcing the metal belt 213 laterally.

For some non-liquid materials which can not be pumped it is possible to use a worm type pressure developing device, (not shown) of the conventional form commonly termed an extruder for feeding the material into the pressure chamber.

Figure 34:
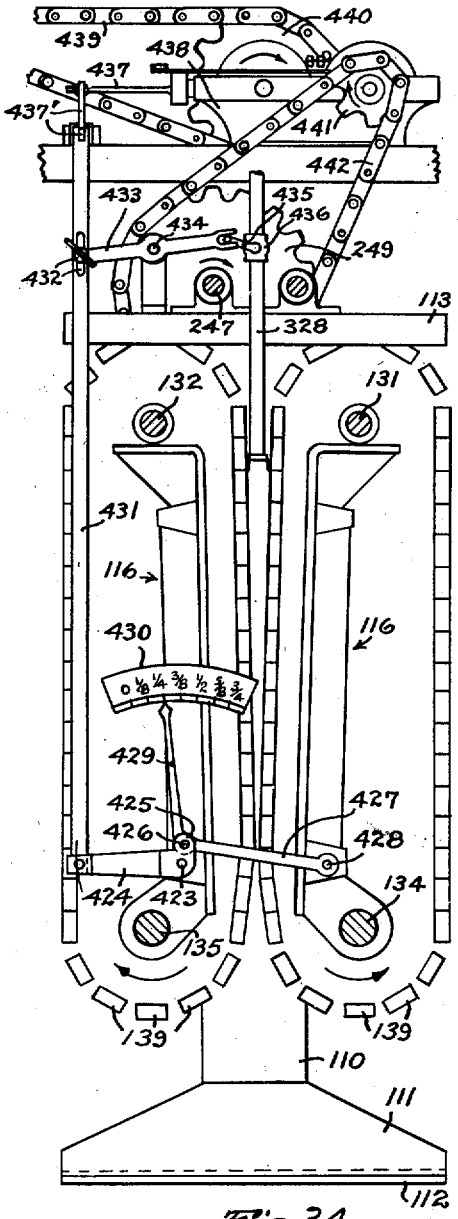
Figure 34 is an elevation showing means for varying either the feed of the machine or the speed of movement of the belts, or both, automatically in proportion to the thickness of the cake or body of solid matter between the filter belts at the location where said cake is most highly compressed.

In Fig. 34 I have disclosed means for indicating the thickness of the cake or body of solid material at the point where said cake is most highly compressed and have further disclosed automatic means for varying the rate of feed and the speed of travel of the filter belts and associated moving parts in proportion to the thickness of said cake at its point of minimum thickness, whereby automatic uniformity of operation results, and whereby a substantially constant thickness of the cake may be maintained. This point of minimum thickness will be the point where the two opposed slat belts approach most closely to each other.

This means may comprise a bell crank lever mounted on a pivot 423, which pivot is secured to one of the pendent frames 116 near the lower end thereof. The bell crank lever has a longer horizontal arm 424 and a shorter vertical arm 425. The shorter arm 425 is connected by a pivot 426 with one end of a link 427. The other end of the link 427 is connected by a pivot 428 with the lower end of the other pendent frame member 116. When the distance between the two pendent frames is varied, it will be apparent that the bell crank lever formed by arms 424 and 425 will be oscillated on the pivot 423. A pointer member 429 is secured to the bell crank lever 424—425 near the pivot 423 and is positioned to be moved over a scale 430 when said bell crank lever is oscillated whereby said pointer will indicate on said scale the distance of separation of the two pendent frame members and the consequent minimum thickness of the cake of solid material.

The end of the longer bell crank arm 424 remote from the pivot 423 is pivotally connected with a vertically movable actuator bar 431. The upper portion of the actuator bar 431 is connected by adjustable pivot means 432 with one end of a valve operating lever 433 which is fulcrumed on a pivot 434. The other end of the valve operating lever 433 is operatively connected with a handle member 435 of a valve 436. The valve 436 is provided in the fluid inlet tube 328 through which fluid is introduced into the machine, whereby the rate of feed of material into the machine is controlled by the movement toward and away from each other of the lower ends of the pendent frames, movement away from each other of said pendent frames operating to reduce the rate of feed and movement toward each other of said pendent frames operating to increase the rate of feed. In this way the feed of the machine will be regulated automatically in proportion to the thickness of the cake at the point of maximum compression, the presence of a thicker cake tending to reduce the feed and the presence of a thinner cake tending to increase the feed, the result being that the cake will be maintained at an approximately constant thickness.

The speed of the drive, and the consequent speed of movement of the filter belts and metal side belts which cooperate to form the pressure chamber may also be governed by the actuator bar 431 in such a manner as to speed up the drive in the event the thickness of the cake of material increases, and to reduce the speed of the drive in the event the thickness of the cake of material decreases. This is accomplished by connecting the upper portion of the actuator bar 431 through bell crank means 437′ with the control lever 437 of a variable speed power transmission 438. The mechanism of the variable speed power transmission may be of well known conventional standard construction and is not shown in detail. It is arranged so that the spreading apart movement of the lower ends of the pendent frames due to the presence of a thicker cake of solid material will increase the speed of the drive and tend to reduce the thickness of said cake and movement toward each other of the lower ends of the pendent frame members due to the presence of a thinner cake of solid material will reduce the speed of the drive, thereby tending to increase the thickness of the cake. The variable speed mechanism 438 may be driven by a link belt 439 connected with a sprocket wheel 440 and the drive from said variable speed mechanism 438 to the main drive shaft 247 of the machine may be by a sprocket pinion 441 and link belt 442 to the sprocket wheel 249 on the main drive shaft 247.

Obviously, the automatic speed regulating mechanism and the automatic feed regulating mechanism shown in Fig. 34 may be used separately and independently of each other or the two may be used jointly and in conjunction with each other as described in connection with said Fig. 34.

It will be understood that the means for indicating the thickness of the cake of solid matter and automatically controlling the rate of feed or the driving speed of the machine may be connected with other parts of the machine which have a movement proportional to the movement of the pendent frames, as for instance, in Fig. 1 I have shown devices connected with the block 392 of the equalizer means at the bottom end of the machine for accomplishing these purposes. This means may comprise a link 613 pivotally connected at its upper end with the block 392 and pivotally connected at its lower end with the shorter arm of an electrically conductive lever 614, which is fulcrumed on a pivot 615. The longer arm of the lever 614 may have a contact brush 616 which also may serve as a pointer and is movable simultaneously over a graduated dial 617 and over contacts 618 of a rheostat, which contacts may be connected with a resistance 619. The resistance 619 may control the speed of a motor M and the motor M may control either the driving speed or the rate of feed of the machine or it may control both the driving speed and rate of feed of the machine to thereby automatically control the thickness of the discharging cake.

In some instances I find it desirable to anchor the lower end of one of the pendent frame members 116 to the lower portion of the non-movable frame of the machine as illustrated in Fig. 47. When this is done the transverse shaft 134 at the bottom of the pendent frame may become relatively fixed and the gearing by which the drive is transmitted from said shaft 134 to the metal side belts 213 will then be subjected to much less wear and strain than it will be when said drive is derived from the transverse shaft at the lower end of a pendent frame member which is free to swing or move. In Fig. 47 I have shown the lower end of one of the pendent frames 116 fixedly but adjustably secured to the lower portion of the main frame 110—111 by link means 443, one end of said link means being connected with the shaft 134 at the lower end of the pendent frame and the other end of the link means being adjustably connected by slot and bolt means 444 with the main frame of the machine. In this form of construction the two pendent frame members are connected with each other by the same transverse tie members 193, but all swinging movement will occur in one of said frame members during the operation of the machine. When one of the pendent frame members is thus fixedly held at the bottom, it is possible to simplify the drive to the side belts due to the fact that there is no swinging movement of the shaft 134, from which the drive for said side belts is derived.

In Figs. 35, 36 and 37 I show a method of feeding slimy material, which presents the problem of not readily forming a cake on the filter cloth, but rather tends to back up under the pressure exerted by the two approaching belts. Another problem is presented in separating liquid from material like finely divided cocoa which forms a cake, but the cake is highly impermeable to liquid being expressed, so that it results that a thin film of this cake on the filter cloth operates as a dam or impervious belt to the further expressing of the liquid from the material in the filter chamber being treated. In handling both of these types of material I provide one or more strips of thick porous sponge like fabric 454 capable of absorbing a relatively large amount of the material to be treated. This strip 454 becomes saturated with the material in passing through the machine. It has two important functions; first, it insures that slimy material will be carried or dragged through the pressure zone by the permeable fabric; second, it provides drainage passageways by providing a permeable passageway from the interior of the pressure chamber to the filter belts and prevents the material which is being pressed from compacting into a continuous impervious and non-draining mass. As the porous strip 454 passes downwardly through the filter chamber between the filter cloths 205, it is obvious that the ribs of the porous strip 454 will contact or approach near to the filter cloths. Accordingly, even though a relatively impervious cake is built up within the recessed area representing the depression between the ribs, so that liquids cannot pass therethrough, nevertheless the liquids under pressure will find an avenue of escape through the central or web portion of the strip and then through the ribs to the filter cloth or belts 205. After passing through the machine, the strip 454 may be wound upon a roller 455 if desired, said strip being carried through the filter or pressure chamber by the moving belts and the cake formed therebetween. Before the strips 454 are used again, they may be cleaned to remove the solid matter therefrom. In instances where I use filter strips in place of the endless filter belts 215, I may wind the filter strips on a roller in this same manner. The strip 454 may be any thick porous material. I find that material of the form commonly used under rugs as a padding is suitable for this purpose. Material of this nature is shown in Figs. 36 and 37. The rib portions are an important feature of this material in that they form permeable liquid conducting members or passageways extending from the web of the strip into contact with, or to a point near the filter cloth. Thus, I have dscovered a means for continuously filtering slimy material, the filtering of which material has heretofore been impossible in a machine of this character, i. e., in a machine having converging belts, through which cake and belts liquids thereafter must find their way in being separated from the material in the filter chamber.

When certain types of non-liquid material, as German moss, wet clothes in a laundry or other materials of this nature are to be fed into this machine conveyor mechanism of the form shown in Figs. 38 and 39 may be used. This mechanism embodies a driven endless belt conveyor 456 operable on rolls 457 and positioned between side members 458 and adapted to deliver a continuous stream of material 459 into the machine.

In addition to illustrating the use of the porous absorbent carrier strip 454, Fig. 35 also shows a modified form of carrier mechanism for the filter belts 205, said carrier mechanism being in the nature of chain mesh belts 460 of conventional construction which are carried on rollers 461 in the pressure zone. Aside from the chain mesh belts 460 and rollers 461 the machine shown in Fig. 35 may be similar to the machine disclosed in Figs. 1 to 5, inclusive.

In Fig. 45 I have shown a modified form of compression spring arrangement which may be used in connection with any of the several forms of my invention to secure a greater spring pressure. In this construction I do not mount the springs directly on the tie rods, but mount springs 553 on guide pins 554 between two strong and heavy yoke members 555 and 556. The inner yoke member 555 acts as support means for the slat belt indicated at 139', and the outer yoke member 556 is supported by the tie rods 193. Obviously, this construction makes it possible to provide for a much greater spring pressure and also makes possible the construction of a much wider machine.

In Fig. 49 I have shown apparatus for supporting the impervious side belts against the ends of the slats of the main slat belt with a pressure which varies with the hydrostatic pressure within the pressure chamber 138, i. e., the pressure on the side belts is correlated with the hydrostatic pressure in the pressure chamber. This will obviously lessen the frictional contact between the folded over edge portions 205' of the filter cloths 205 and the impervious side belts when the machine is operating at lower hydrostatic pressures and will provide for applying the necessary additional pressure to the side belts to prevent leakage when the pressure within the chamber 138 increases. The object of this apparatus is to maintain at all times a pressure against the exterior of the side belts which is just enough in excess of the pressure exerted against the insides of said side belts by the material in the filter chamber to keep said side belts always sealed against the filter belts as respects leakage. This apparatus is also well adapted as a supporting means for the plate 520 of Fig. 48, in which construction friction would be very much greater than in the instance of the moving side belts. One pressure controlled apparatus for supporting the side belts is shown in Fig. 49. This apparatus may comprise a plurality of side belt supporting units, each embodying a piston rod 590 connected with cross springs 591, which may correspond generally to the spring 523 of Fig. 48, and by which a track 592 for the impervious side belt is supported. The piston rods 590 each extend into a cylinder 593 and are connected with a piston 594, which engages with an elastic diaphragm 595. A liquid conduit pipe 596 communicatively connects each cylinder 593 with a pressure chamber 597 in a housing member 602. An elastic diaphragm 601 in the housing 602 separates the chamber 597 from another chamber 598. The elastic diaphragm serves as a means for separating said two chambers 597 and 598 and at the same time makes it possible to maintain an equal pressure in said two chambers without the interchange of any liquid therebetween. The chamber 598 is connected by a pipe 603 with the pressure chamber 138. The other chamber 597 is connected with the pipe 596, whereby one side of the flexible diaphragm 601 is subjected to the pressure within the pressure chamber 138 of the machine and the other side of said diaphragm is subjected to the same pressure as the diaphragms 595 and pistons 590 of the side belt supporting units. An initial liquid supply pipe 599 is connected with the pipe 596 and provided with a valve 604, whereby an initial supply of liquid may be introduced into the pipe 596 and whereby this liquid supply may be replenished if necessary. In the usual operation of the device, the valve 599 will be closed. A stem 605 is secured to each piston 594 in alignment with the stem 590 and extends outwardly through the outer end of the housing 593 and through a nut 606 which is threaded into a relatively fixed frame bracket 607. The stem 605 is slidable in the nut 606 and in the housing 593, and is provided with a fixed collar 608. A compression spring 609 is provided on the stem 605 between the collar 608 and the end of the nut 606, whereby an initial pressure may always be exerted against the springs 591, irrespective of the liquid pressure exerted on the diaphragms 595. The pressure of spring 609 may be varied by adjusting the position of the nut 606. As the pressure in the pressure or filter chamber 138 of the machine increases, this pressure will be transmitted through pipe 603, housing 602 and pipe 596 to the pressure units 593, thus exerting more pressure against the side belts. As the pressure in the pressure chamber decreases, pressure in the pipe 596 and the pressure in the units 593 will decrease, thus lowering the pressure against the side belts. By the use of this apparatus then it will be obvious that the force with which the side belts are pressed against the edges of the main slat belts may be automatically varied in direct proportion to the pressure in the pressure chamber 138, to provide the desired pressure therebetween with a minimum of friction and corresponding wear. The size and frequency of the pressure exerting units may be such as to produce just enough pressure against the metal side belts to always offset the pressure within the chamber 138 and the pressure of the springs 609 may always be a sufficient component in excess of the liquid pressure to keep the metal side belts pressed tightly against the ends of the main slat belts. Accordingly, springs 609 may be adjusted by nuts 606 to provide just the necessary excess pressure to correct leaks.

The operation of the several parts of this combined press and filter press has been fully set forth in the foregoing description. The general operation of the machine may be summarized as follows: When the machine is to be used as a filter press suitable means is employed for introducing material in a liquid state under pressure into the machine through the plug top closing member or packing plug at the top of the filter chamber. Power is applied to rotate the driving shaft 247 and operate the ratchet drive means, thereby producing a downward movement of the several belts and filter cloths which form walls of the filter chamber. The recoverable liquid portion of the material thus introduced is pressed out through the filter cloth belts 205 and may be collected. The solid portion of the material gradually accumulated on the filter belt means is carried downwardly in the convergent pressure chamber by the moving belts and may be subjected to very high pressure in the lower portion of said chamber and eventually discharged in the form of a cake at the lower end of the machine. A very high pressure may be produced and consequently a very large percentage of the liquid may be pressed out through the filter belt means and the liquid content of the discharging cake may be very low. This cake may expand in thickness as it discharges depending on the characteristics of said cake. The filtrate may be picked up by the pick-up devices 372—373, which are located at different elevations, and which may constitute a means for grading the filtrate. The filtrate picked up by the pans 381 and 386 may be a different grade from that picked up by the pick-up devices.

When solid matter is being fed to the machine the mode of operation will be substantially the same, the solid matter having substantially all recoverable moisture pressed out of it during its travel through the filter chamber and being discharged as a cake from the lower end of the machine.

It will be understood that the filter belts may be used when required, or that said filter belts may be removed or left out and the material allowed to come in direct contact with the slat belts, where the character of the material permits.

Obviously, changes may be made in the forms, dimensions and arrangement of the parts of my invention, without departing from the principle thereof, the above setting forth only preferred forms of embodiment.

I claim:

1. A continuous pressure separating device of the class described embodying a stationary frame; two belt supporting frames, one of said belt supporting frames being pendently mounted on said stationary frame; traveling belts forming walls of a filter chamber; means producing pressure in the material operated upon passing through said filter chamber which material under pressure tends to urge said belts and supporting frames apart; tie rods operatively disposed between said belt supporting frames and floatingly mounted as respects one of said frames; and resilient means operatively disposed between the end portions of the tie rods and one of said frames, said tie rods and resilient means yieldingly resisting separation of the frames, whereby pressures developed during operation are substantially transmitted to said tie rods without being transmitted to said stationary frame.

2. A continuous pressure separating device of the class described embodying a stationary frame having two vertical upright members and a top cross member; two belt supporting frames; pivotal mounting means for each of said belt supporting frames, each of said pivotal mounting means being movable toward and away from the other and said pivotal mounting means being attached to the upper part of said upright members, whereby said belt supporting frames may be pendently supported; and adjusting means connecting the pivotal mounting of one pendent frame with the pivotal mounting of the other pendent frame on the same side of the device, whereby the belt supporting frames at their pivotal mountings are adjustable with respect to each other.

3. A continuous pressure separating device of the class described comprising two belt supporting frames, one of said frames being pendently mounted at its upper end portion and being relatively swingingly movable toward and away from the other frame; traveling pervious belts mounted on said frames and forming a filter chamber; means producing pressure in the material operated upon passing through said filter chamber which material under pressure tends to urge said belts and supporting frames apart; variable material delivery means connected with said filter chamber; and variable material delivery control means operatively connected to and operated by the movement of said swinging frame, whereby the delivery of material to said filter chamber is controlled by the position of said swinging frame.

4. A continuous pressure separating device of the class described comprising two belt supporting frames, one of said frames being pendently mounted at its upper end portion and being relatively swingingly movable toward and away from the other frame; traveling pervious belts mounted on said frames and forming a filter chamber; means producing pressure in the material operated upon passing through said filter chamber which material under pressure tends to urge said belts and supporting frames apart; variable speed driving means connected with said traveling pervious belts; and variable speed driving control means operatively connected to and operated by the movement of said swinging frame, whereby the speed of said traveling pervious belts is controlled by the position of said swinging frame.

5. A continuous pressure separating device of the class described comprising two belt supporting frames, one of said frames being pivotally mounted and being relatively swingingly movable toward and away from the other frame; traveling pervious belts mounted on said frames and forming a filter chamber; means producing pressure in the material operated upon passing through said filter chamber which material under pressure tends to urge said belts and supporting frames apart; variable material delivery means connected with said filter chamber; and variable material delivery control means operatively connected to and operated by the movement of said swinging frame, whereby the delivery of material to said filter chamber is controlled by the position of said swinging frame.

6. A continuous pressure separating device of the class described comprising two belt supporting frames, one of said frames being pivotally mounted and being relatively swingingly movable toward and away from the other frame; traveling pervious belts mounted on said frames and forming a filter chamber; means producing pressure in the material operated upon passing through said filter chamber which material under pressure tends to urge said belts and supporting frames apart; variable speed driving means connected with said traveling pervious belts; and variable speed driving control means operatively connected to and operated by the movement of said swinging frame, whereby the speed of said traveling pervious belts is controlled by the position of said swinging frame.

7. A continuous pressure separating device of the class described embodying a pervious moving belt forming one wall of a chamber; and an impervious moving belt contacting with an edge of said pervious belt and forming another wall of said chamber, whereby under relatively high pressure a fluid tight continuously forming sealing contact is provided with minimum friction between said belts.

8. A continuous pressure separating device of the class described embodying a filter chamber formed by two oppositely disposed filter belt means and two oppositely disposed side belt means, the edge portions of said filter belt means contacting said side belt means, said side belt means comprising a reinforcing means and a metallic impervious belt idly mounted thereon, whereby a continuous traveling fluid tight seal is provided between said filter belt means and said side belt means, both of which normally have the same rate of speed.

9. A continuous pressure separating device of the class described embodying two spaced apart moving pervious belts forming two opposite sides of a pressure chamber; means supporting said pervious belts; two impervious moving belts contacting with the respective edges of said pervious belts; a flexible trackway for said impervious belts; and a plurality of adjustable resilient supporting means for said trackway, whereby local adjustment is provided for said impervious belts to afford continuous fluid tight seal between the edge portions of the pervious belts and the impervious belts.

10. A continuous pressure separating device of the class described embodying two upright pendent frame members disposed face to face in spaced apart relation; pivots supporting the upper ends of said frame members permitting swinging movement of said frame members toward and away from each other; reinforcing belts movable on said frame members; pervious filter belts supported on said reinforcing belts; and moving side belts at the edges of said filter belts cooperating therewith to form a filter chamber, the edges of said filter belts extending around the edges of said reinforcing belts and contacting the surfaces of said side belts to form a liquid tight seal.

11. A continuous pressure separating device of the class described embodying a filter chamber formed by two oppositely disposed filter belt means and two oppositely disposed side belt means, said side belt means comprising a reinforcing belt, side belt idly mounted on and frictionally engaging the said reinforcing belt, rollers mounted on said reinforcing belt, a track on which said rollers run, and spring means on which said track is mounted.

12. A continuous pressure separating device of the class described embodying a stationary frame having two vertical upright members and a top cross member; a filter chamber formed by two oppositely disposed filter belt means and two oppositely disposed side belt means, which side belt means comprises a reinforcing belt, a metallic belt idly mounted on and frictionally engaging the said reinforcing belt, rollers mounted on said reinforcing belt, a track on which said rollers run, spring means on which said track is mounted; and adjusting screws mounted in said upright members engaging said spring means, whereby the pressure between the side belt and the filter belt means may be adjusted locally.

13. A continuous pressure separating device of the class described embodying a moving slat belt forming one side of a pressure chamber; a shaft supporting the lower end of said slat belt; an impervious moving belt contacting an edge portion of said slat belt and forming one side of the filter chamber; a second shaft arranged at right angles to said first named shaft and supporting the end of said impervious belt; and driving means interconnecting said slat belt shafts and said impervious belt shafts.

14. A continuous pressure separating device of the class described embodying a moving slat belt forming one side of a pressure chamber; a shaft supporting the lower end of said slat belt; an impervious moving belt contacting an edge portion of said slat belt and forming one side of the filter chamber; a second shaft arranged at right angles to said first named shaft and supporting the end of said impervious belt; driving means for said slat belt shaft; bevel gears interconnecting said slat belt shaft and said impervious belt shaft, the bevel gear on said impervious belt shaft being splined on its shaft; and a yoke fixedly positioning the gear on said slat belt shaft with respect to the gear on said impervious belt shaft, whereby said slat belt shaft may be moved toward and away from said impervious belt shaft without disturbing the meshing of said bevel gears.

15. A continuous pressure separating device of the class described embodying a pressure filter chamber having a filter belt forming one wall thereof and a side belt forming another wall thereof; pressure means supporting said side belt against an edge portion of said filter belt; and pressure means control devices operatively connected with and responsive to pressure within said pressure chamber whereby the pressure of said pressure means against said side belt is automatically varied to compensate for a change of hydrostatic pressure within the filter chamber.

16. A continuous pressure separating device of the class described embodying a converging pressure chamber having one wall formed by a pervious belt means; and an intermittent driving means directly, mechanically connected to said belt, whereby the material being operated upon is alternately subjected to increased pressure and a rest period for drainage, thereby providing in continuous press operation continuously applied pressure, periodically increased pressure and periodic drainage periods.

17. A continuous pressure separating device of the class described embodying a filter chamber having two oppositely disposed belt means; an intermittent driving means for said belts, said driving means comprising a driving shaft for each of said belts; a sprocket wheel keyed on each of said driving shafts, said sprocket wheel operatively engaging the belt means; a ratchet wheel keyed to each of said driving shafts; lever arms idly mounted with respect to each of said driving shafts; a pawl carried by each of said lever arms operatively disposed with respect to said ratchet wheels; a driving crank; and link means connecting said crank to said lever arms.

18. A continuous pressure separating device of the class described embodying a filter chamber having two oppositely disposed belt means; an intermittent driving means for said belt means, said driving means comprising a driving shaft for each of said belts; a sprocket wheel keyed on each of said driving shafts, said sprocket wheel operatively engaging the belt means; a ratchet wheel keyed to each of said driving shafts; lever arms idly mounted with respect to each of said driving shafts; a pawl carried by each of said lever arms operatively disposed with respect to said ratchet wheels; a driving crank; link means connecting said crank to said lever arms; and controlling means for said lever arms, whereby the length of stroke of said arms is predetermined.

19. A continuous pressure separating device of the class described embodying a filter chamber having two oppositely disposed belt means; two belt supporting frames pendently mounted at their upper end portions; an intermittent driving means for said belt means, said means comprising a driving shaft for each of said belts, said shafts being respectively mounted on each of said pendently mounted frames, whereby provision is made for relative movement of said frames; a sprocket wheel keyed on each of said driving shafts, said sprocket wheel engaging the belt means; a ratchet wheel keyed to each of said driving shafts; lever arms idly mounted with respect to each of said driving shafts; a pawl carried by each of said lever arms operatively disposed with respect to said ratchet wheels; a driving crank; and link means connecting said crank to said lever arms.

20. A continuous pressure separating device of the class described embodying a filter chamber having two oppositely disposed belt means; two belt supporting frames pendently mounted at their upper end portions; an intermittent driving means for said belts, said means comprising a driving shaft for each of said belts, said shafts being respectively mounted on each of said pendently mounted frames, whereby provision is made for the relative movement of said frames; a sprocket wheel keyed on each of said driving shafts, said sprocket wheel engaging the belt means; a ratchet wheel keyed to each of said driving shafts; lever arms idly mounted with respect to each of said driving shafts; a pawl carried by each of said lever arms operatively disposed with respect to said ratchet wheels; a driving crank; link means connecting said crank to said lever arms; and guide means operatively connected to said lever arms, whereby movement of the lower arms in arcs of equal length for each stroke is provided.

21. A continuous pressure separating device of the class described embodying a filter chamber having two oppositely disposed belt means; two belt supporting frames pendently mounted at their upper end portions; an intermittent driving means for said belt, said means comprising a driving shaft for each of said belts, said shafts being respectively mounted on each of said pendently mounted frames, whereby provision is made for the relative movement of said frames; a sprocket wheel keyed on each of said driving shafts, said sprocket wheel engaging the belt means; a ratchet wheel keyed to each of said driving shafts; lever arms idly mounted with respect to each of said driving shafts; a pawl carried by each of said lever arms operatively disposed with respect to said ratchet wheels; a driving crank; link means connecting said crank to said lever arms; and interconnecting means for said lever arms, whereby the angular displacement of said arms is equal at all times throughout the stroke of sa' ' arms, thereby providing for equal and simultaneous travel of the filter belts which are thus protected against undue wear by unnecessary slippage.

22. In a continuous pressure separating device of the class described, a slat belt, each slat of said belt comprising a hollow structure with a face having a filtrate passageway therethrough; a discharge opening; collecting means disposed operatively in registration with said discharge openings of said slats; and resilient means yieldingly holding said collecting means against said discharge openings of said slats whereby filtrate collected in said hollow slats may be conducted to said collecting means.

23. In a continuous pressure separating device of the class described, oppositely disposed moving pervious belts forming the sides of a pressure chamber through which material may pass; and a porous absorbent member in said chamber between said pervious belts movable in the same direction as said belts, said porous member serving to facilitate the movement of material through said pressure chamber.

24. In a continuous pressure separating device of the class described, oppositely disposed moving pervious belts forming the sides of a pressure chamber through which material may pass; and a porous absorbent member in said chamber between said pervious belts movable in the same direction as said belts, said porous absorbent member having thickened portions affording shallow chambers therebetween, said thickened portions forming drainage conductor means when said thickened portions approach the oppositely disposed pervious belts, said porous member serving to facilitate the movement of material through said pressure chamber.

25. A continuous pressure separating device of the class described, embodying a stationary frame; two belt supporting frames pivotally mounted on said stationary frame; traveling belts forming walls of a filter chamber; means producing pressure in the material operated upon passing through said filter chamber which material under pressure tends to urge said belts and suporting frames apart; tie rods operatively disposed between said belt supporting frames and floatingly mounted as respects one of said belt supporting frames; and resilient means disposed between the end portions of the tie rods and one of said frames, said tie rods and resilient means yieldingly resisting separation of the frames, whereby pressures developed during operation are substantially transmitted to said tie rods without being transmitted to said stationary frame.

26. A continuous pressure separating device of the class described, embodying a stationary frame; belt means; two supporting frames for said belt means pivotally mounted on said stationary frame; revolvable belt carrying means disposed on the end portions of said supporting frames; and pivotal supporting means for each of said frames disposed intermediate said revolvable belt carrying means, whereby the rotating bearing pressure on the revolvable belt carrying means is greatly reduced, and control of the speed of the belt means is facilitated.

27. A continuous pressure separating device of the class described, embodying a stationary frame; belt means; two supporting frames for said belt means, one of said supporting frames being pivotally mounted on said stationary frame; revolvable belt carrying means disposed on the end portions of said supporting frames; pivotal supporting means for each of said frames disposed intermediate said revolvable belt carrying means, whereby the rotating bearing pressure on the revolvable belt carrying means is reduced, and control of the speed of the belt means is provided; adjusting means connecting the pivotal supporting means of one frame with the pivotal supporting means of the other frame; tie rods operatively disposed between said belt supporting frames and floatingly mounted as respects one of said belt supporting frames; and resilient means disposed between the end portions of the tie rods and one of said frames, said tie rods and resilient means yieldingly resisting separation of the frames, whereby pressures developed during operation are substantially transmitted to said tie-rods without being transmitted to said stationary frame.

28. A continuous pressure separating device of the class described embodying a stationary frame; two belt supporting frames pendently mounted on said stationary frame; belts rotatably mounted on said belt supporting frames forming walls of a filter chamber; means for producing pressure in the material operated upon passing through said filter chamber which material under pressure tends to urge said belts and supporting frames apart; tie rods operatively disposed between said belt supporting frames and floatingly mounted as respects one of said belt supporting frames; and resilient means disposed between the end portions of the tie rods and one of said frames, said tie-rods and resilient means yieldingly resisting separation of the frames, whereby pressures developed during operation are substantially transmitted to said tie-rods without being transmitted to said stationary frame.

29. A continuous pressure separating device of the class described embodying moving pervious belts forming walls of a filter chamber; frames supporting said belts, one of said frames being pendently mounted at its upper end portion and being relatively swingingly movable toward and away from the other frame; means producing pressure in the material operated upon passing through said filter chamber which material under pressure tends to urge said belts and supporting frames apart; and indicating means operated by the movement of said swinging frame, whereby the position of said swinging frame and resultant thickness of the pressed cake may be indicated.

30. A continuous pressure separating device of the class described, embodying a stationary frame; two belt supporting frames, one of said frames being pivotally mounted on said stationary frame; belts rotatably mounted on said belt supporting frames, forming walls of a filter chamber; means producing pressure in the material operated upon passing through said filter chamber which material under pressure tends to urge said belts and supporting frames apart; tie rods operatively disposed between said frames and floatingly mounted as respects one of said frames; and resilient means operatively disposed between the end portions of the tie rods and one of said frames, said tie rods and resilient means yieldingly resisting separation of the frames, whereby pressures developed during operation are substantially transmitted to said tie rods without being transmitted to said stationary frame.

31. A continuous pressure separating device of the class described embodying moving pervious belts forming walls of a filter chamber; frames supporting said belts, one of said frames being pivotally mounted and being relatively swingingly movable toward and away from the other frame; means producing pressure in the material operated upon passing through said filter chamber which material under pressure tends to urge said belts and supporting frames apart; and indicating means operated by the movement of said swinging frame, whereby the position of said swinging frame and resultant thickness of the pressed cake may be indicated.

32. In a continuous pressure separating device of the class described, a stationary frame; two belt supporting frames, one of said frames being pivotally mounted on said stationary frame; traveling belts mounted on said belt supporting frames and forming a filter chamber; means producing pressure in the material operated upon passing through said filter chamber which material under pressure tends to urge said belts and supporting frames apart; tie rods operatively disposed between said belt supporting frames and floatingly mounted as respects one of said frames; yoke members mounted on said tie rods; and resilient means operatively connecting said yoke members to said belt supporting frames, whereby pressures developed during operation are substantially transmitted to said tie rods without being transmitted to said stationary frame.

33. A continuous pressure separating device of the class described embodying a stationary frame; two belt supporting frames; pivotal mounting means for each of said pivotal belt supporting frames; means mounting each of said pivotal mounting means on said stationary frame for movement toward and away from the other; and adjusting means connecting the pivotal mounting of one belt supporting frame with a pivotal mounting of the other belt supporting frame, whereby the belt supporting frames at their pivotal mountings are adjustable with respect to each other.

34. A continuous pressure separating device of the class described comprising two frame members disposed face to face in spaced apart relation; pivot means supporting one of said frame members permitting relative swinging movement of the frame members toward and away from each other; reinforcing belts movable on said frame members; pervious filter belts supported on said reinforcing belts; and moving side belts at the edges of said filter belts cooperating therewith to form a filter chamber, the edges of said filter belts extending around the edges of said reinforcing belts and contacting the surfaces of said side belts to form a liquid tight seal.

35. A continuous pressure separating device of the class described comprising a filter chamber formed by two oppositely disposed filter belt means and two oppositely disposed side belt means, which side belt means comprises a reinforcing belt, an impervious belt idly mounted on and frictionally engaging the said reinforcing belt, rollers mounted on said reinforcing belt, a track on which said rollers run, spring means on which said track is mounted; and adjusting screws engaging said spring means, whereby the pressure between the side belt and the filter belt means may be adjusted locally.

36. A continuous pressure separating device of the class described comprising a moving filter belt forming one side of a pressure chamber; a shaft supporting an end of said filter belt; an impervious moving belt contacting an edge portion of said filter belt and forming one side of the filter chamber; a second shaft arranged at right angles to said first named shaft and supporting an end of said impervious belt; and driving means interconnecting said filter belt shafts and said impervious belt shafts, whereby said filter belt and said impervious belt may be synchronously driven and movement therebetween prevented.

ROBERT M. THOMPSON.